(12) United States Patent
Baldwin et al.

(10) Patent No.: US 10,387,571 B2
(45) Date of Patent: Aug. 20, 2019

(54) NETWORKED DEVICE WITH SUGGESTED RESPONSE TO INCOMING MESSAGE

(71) Applicant: Vidicons LLC, Greenville, SC (US)

(72) Inventors: Gary Baldwin, Greenville, SC (US); Eric La Mont, Greenville, SC (US)

(73) Assignee: VIDICONS LLC, Greenville, SC (US)

( * ) Notice: Subject to any disclaimer, the term of this patent is extended or adjusted under 35 U.S.C. 154(b) by 0 days.

(21) Appl. No.: 15/655,460

(22) Filed: Jul. 20, 2017

(65) Prior Publication Data

US 2018/0024991 A1 Jan. 25, 2018

Related U.S. Application Data

(60) Provisional application No. 62/364,734, filed on Jul. 20, 2016.

(51) Int. Cl.
| | |
|---|---|
| *G06F 17/27* | (2006.01) |
| *H04L 12/58* | (2006.01) |
| *G06F 3/0482* | (2013.01) |
| *G06F 16/2457* | (2019.01) |

(52) U.S. Cl.
CPC ........ *G06F 17/2785* (2013.01); *G06F 3/0482* (2013.01); *G06F 16/24575* (2019.01); *G06F 16/24578* (2019.01); *H04L 51/02* (2013.01); *H04L 51/36* (2013.01); *H04L 51/32* (2013.01)

(58) Field of Classification Search
CPC ............... G06F 2203/011; G06F 17/27; G06F 17/2785; G06F 17/30477; H04L 51/10
See application file for complete search history.

(56) References Cited

U.S. PATENT DOCUMENTS

| 10,061,977 | B1* | 8/2018 | Chang | G06K 9/00315 |
|---|---|---|---|---|
| 2014/0089399 | A1* | 3/2014 | Chun | G06Q 50/01 709/204 |
| 2014/0094156 | A1* | 4/2014 | Uusitalo | H04W 4/20 455/418 |
| 2014/0337257 | A1* | 11/2014 | Chatterjee | G06N 99/005 706/12 |
| 2015/0339376 | A1* | 11/2015 | Wieweg | G06F 17/30654 707/739 |
| 2016/0019402 | A1* | 1/2016 | Khandelwal | H04L 67/306 726/26 |
| 2016/0253552 | A1* | 9/2016 | Rihn | G06K 9/00302 382/224 |

(Continued)

*Primary Examiner* — Richemond Dorvil
*Assistant Examiner* — Mark Villena
(74) *Attorney, Agent, or Firm* — Schwegman Lundberg & Woessner, P.A.

(57) ABSTRACT

Systems, networked devices, and methods are disclosed for suggesting a response to an incoming message. In one aspect, a method includes receiving, by a first electronic device for a first user, the incoming message from a second user, determining a present emotional state of the second user based on the incoming message, determining a target state of the second user based on the present emotional state, determining a response to the incoming message based on the target state, and writing data derived from the response to an output device. In some aspects, the method also includes identifying other users having characteristics similar to those of the second user, and selecting the response to the incoming message from responses provided to users having the similar characteristics.

13 Claims, 28 Drawing Sheets

(56) References Cited

U.S. PATENT DOCUMENTS

| | | | |
|---|---|---|---|
| 2016/0379047 A1* | 12/2016 | Natan | G06K 9/00281 |
| | | | 382/201 |
| 2017/0011092 A1* | 1/2017 | Huddleston | G06F 17/30477 |
| 2017/0030726 A1* | 2/2017 | French | G01C 21/3461 |
| 2017/0277330 A1* | 9/2017 | Bae | G06F 3/01 |
| 2018/0024991 A1 | 1/2018 | Baldwin et al. | |
| 2018/0077095 A1* | 3/2018 | Deyle | H04L 51/10 |

* cited by examiner

FIG. 6

| EXPRESSIONS | FACIAL FEATURE 1 | ... | FACIAL FEATURE N |
|---|---|---|---|
| E1 | $C_{E1,FF1}$ | ... | $C_{E1,FFN}$ |
| ... | ... | ... | ... |
| EN | $C_{EN,FF1}$ | ... | $C_{EN,FFN}$ |

FACIAL EXPRESSION MATRIX = 600

FIG. 7

FACIAL FEATURE VECTOR = $(V_{FF1}, ..., V_{FFN})$ — 700

FIG. 8

FACIAL EXPRESSION MATRIX × FACIAL FEATURE VECTOR PRODUCT =

| EXPRESSIONS | EXPRESSION PRODUCTS |
|---|---|
| E1 | $V_{FF1} * C_{E1,FF1} + ... + V_{FFN} * C_{E1,FFN}$ |
| ... | ... |
| EN | $V_{FF1} * C_{EN,FF1} + ... + V_{FFN} * C_{EN,FFN}$ |

800

VOCAL EXPRESSION MATRIX =

| EXPRESSIONS | VOCAL FEATURE 1 | ... | VOCAL FEATURE N |
|---|---|---|---|
| E1 | $C_{E1,VF1}$ | ... | $C_{E1,VFN}$ |
| ... | ... | ... | ... |
| EN | $C_{EN,VF1}$ | ... | $C_{EN,VFN}$ |

VOCAL FEATURE VECTOR = $(V_{VF1}, ..., V_{VFN})$

VOCAL EXPRESSION MATRIX VOCAL FEATURE VECTOR PRODUCT =

| EXPRESSIONS | EXPRESSION PRODUCTS |
|---|---|
| E1 | $V_{VF1} * C_{E1,VF1} + ... + V_{VFN} * C_{E1,VFN}$ |
| ... | ... |
| EN | $V_{VF1} * C_{EN,VF1} + ... + V_{VFN} * C_{EN,VFN}$ |

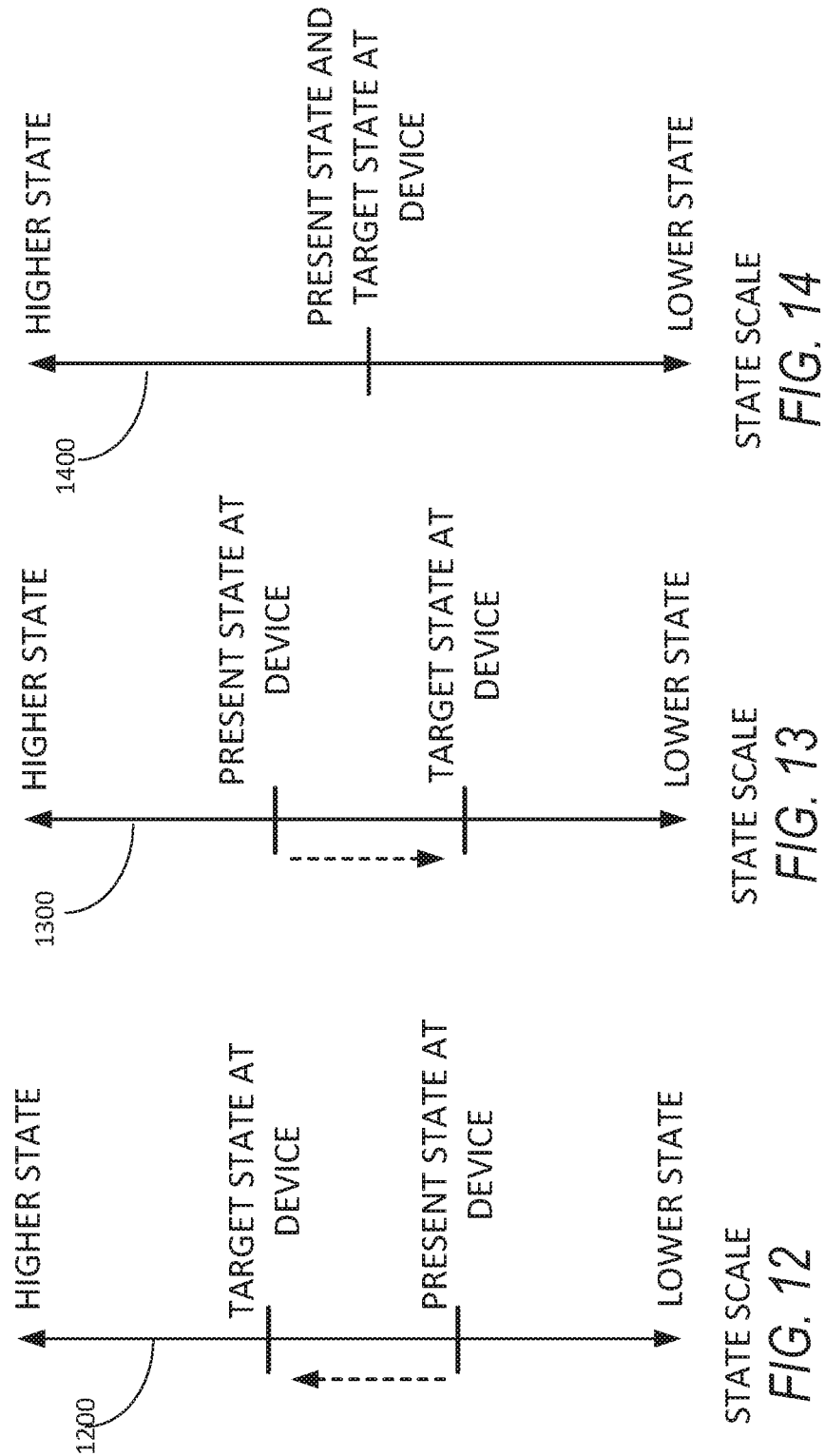

NETWORKED DEVICE WITH SUGGESTED RESPONSE TO INCOMING MESSAGE

CROSS REFERENCE TO RELATED APPLICATIONS

This application claims priority to U.S. Provisional Patent Application No. 62/364,734, filed Jul. 20, 2016, and entitled "NETWORK DEVICE WITH SUGGEST RESPONSE TO INCOMING MESSAGE." The content of this prior application is considered part of this application, and is hereby incorporated by reference in its entirety.

TECHNICAL FIELD

Embodiments described herein relate to networked devices, and to systems, methods, devices, that suggest a response to an incoming message at the networked device.

SUMMARY

One aspect disclosed is a method of determining a response to an incoming message. The method includes receiving, by a first electronic device for a first user, the incoming message from a second user, determining an emotional state associated with the incoming message, determining a target emotional state for the second user, identifying the response to the second user based on the target emotional state, and writing data derived from the response to an output device. In some aspects, identifying the response to the second user based on the target emotional state includes identifying previous responses and resulting emotional states associated with those previous responses, and identifying the response from the previous responses having resulting emotional states consistent with the target emotional state. Some aspects of the method also include identifying a set of users having characteristics similar to the second user, identifying second responses to users in the set of users, and identifying a subset of the second responses with resulting emotional states consistent with the target emotional state, wherein the identifying of the previous responses identifies the subset. Some of these aspects also include identifying the set of users based on one or more of each user's age, gender, or preferences.

Some aspects of the method also include presenting a response to a third user, receiving one or more of image, video, audio, or text data from the third user, generating one or more of an emotional response indication and an emotional intensity indication based on the received one or more image, video, audio, or text data, storing an association between the presented response and the one or more of the generated emotional response indication and emotional intensity indication. The identification of the response to the second user based on the target emotional state is based on the stored association. Some of these aspects also include receiving the one or more of image, video, audio, or text data in a network message from a device associated with the third user.

Some aspects of the method also include identifying a first conversation including the incoming message, the first conversation including a first context, identifying historical conversations having historical contexts similar to the first context, and limiting identification of the response to responses included in the identified historical conversations.

Some aspects of the method also include identifying a plurality of responses to the second user based on the target emotional state, presenting the plurality of responses on an electronic display, receiving input selecting one of the plurality of responses; and identifying the selected response as the response to the second user. Some aspects of the method also include identifying the response to the second user by performing a multivariant search on a set of historical responses resulting in the target emotional state. In some aspects, the multivariant search utilizes Lucerne elastic search. In some aspects, the method includes passing characteristics of the second user and the target emotional state as inputs to the multivariant search.

In some aspects, identifying the response to the second user based on the target emotional state includes identifying previous text responses sent by the first user to the second user, identifying previous video based responses sent by the first user to the second user, identifying text descriptions for the previous video based responses, identifying a subset of the previous text and video based responses having resulting emotional states consistent with the target emotional state, wherein the identified response is based on the subset.

In some aspects, the method includes identifying objective metadata for the previous messages, identify second responses provided to other users, identify second objective metadata for the second responses, identifying a second subset of one or more additional responses to the incoming message from the second responses with second objective metadata indicating resulting emotional states consistent with the target emotional state. The identified response is derived from a combination of the first and second subset. In some aspects, the objective metadata includes first metadata and second metadata, and the method further includes assigning different weights to the first metadata and the second metadata, wherein the identification of the second subset is based on the different weights.

Another aspect disclosed is an apparatus for determining a response to an incoming message. The apparatus includes one or more hardware processors, the hardware processors configured to receive, for a first user, the incoming message from a second user, determine an emotional state associated with the incoming message, determine a target emotional state for the second user, identify the response to the second user based on the target emotional state, and write data derived from the response to an output device.

In some aspects of the apparatus, the hardware processor is further configured to identify the response to the second user based on the target emotional state comprises identifying previous responses and resulting emotional states associated with those previous responses, and identify the response from the previous responses having resulting emotional states consistent with the target emotional state. In some aspects of the apparatus, identifying responses having resulting emotional states consistent with the target emotional state comprises identifying responses that resulted in an emotional state closer to the target emotional state than the emotional state associated with the incoming message is to the target emotional state. In some aspects of the apparatus, the one or more hardware processors are further configured to search a message database using an elastic search to determine relevance scores for a plurality of responses based on meta data associated with the responses, the meta data including indications of resulting emotional states of the responses, characteristics of users provided with the responses, messages preceding the responses, and the incoming message, and selecting the response to the incoming message based on the relevance scores.

Another aspect disclosed is a non-transitory computer readable medium comprising instructions that when executed, cause an electronic hardware processor to perform a method of determining a response to an incoming message. The method includes receiving, by a first electronic device for a first user, the incoming message from a second user, determining an emotional state associated with the incoming message, determining a target emotional state for the second user, identifying the response to the second user based on the target emotional state, and writing data derived from the response to an output device.

BRIEF DESCRIPTION OF THE DRAWINGS

The drawings illustrate example embodiments of the present disclosure and do not limit the scope of the present disclosure.

FIGS. 6-8 are simplified mathematical steps for an input, based on facial expression, to calculate the present state at a networked device that receives the message.

FIGS. 9-11 are simplified mathematical steps for an input, based on vocal expression, to calculate the present state at a networked device that receives the message.

FIGS. 12-14 are simplified state scales that shows relative positions of a present state at the networked device that received the incoming message, and a target state of the suggested response to an incoming message.

DETAILED DESCRIPTION

Figure 1:
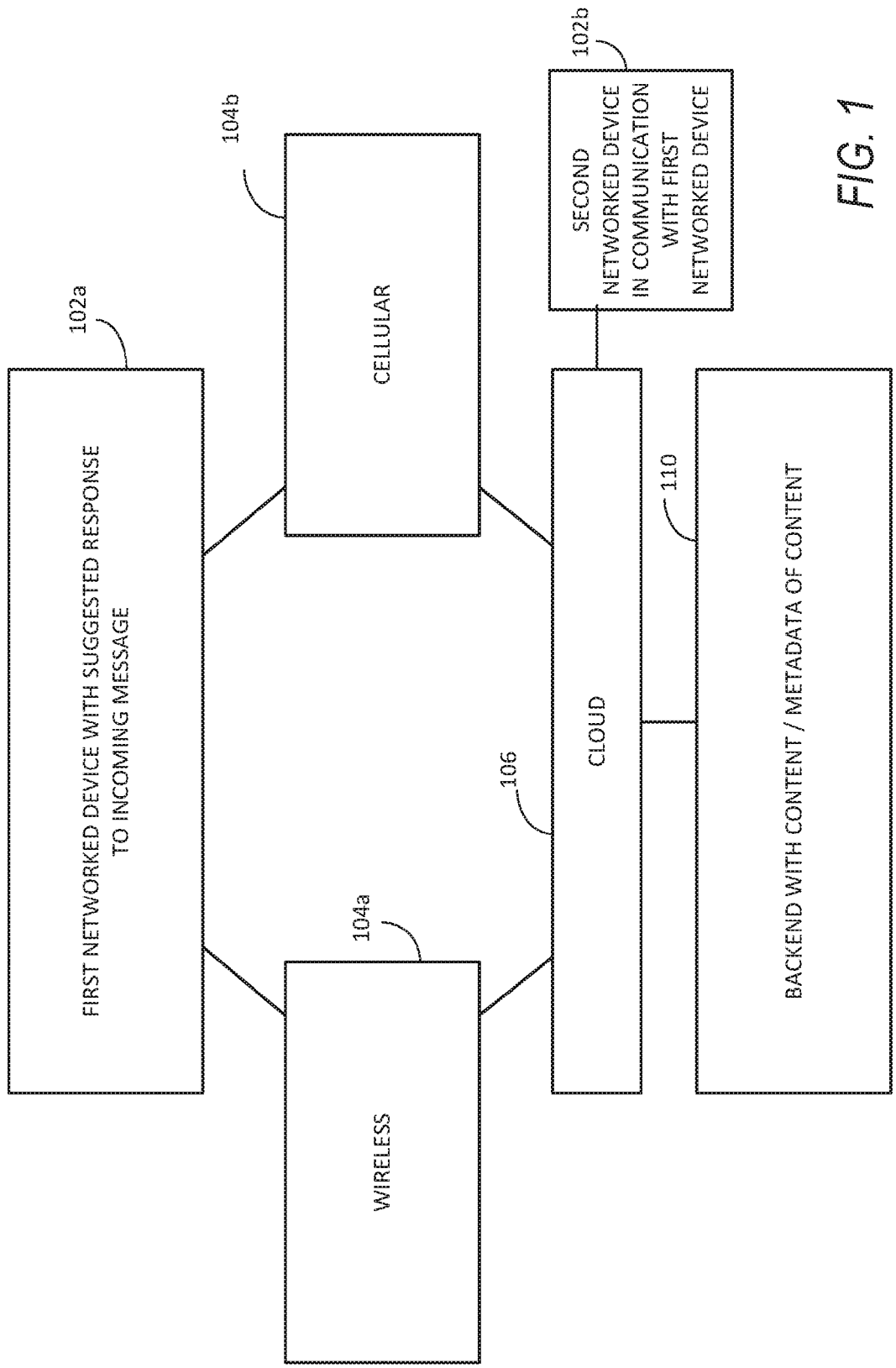
FIG. 1 is a simplified block diagram illustrating one possible system of suggesting a response to an incoming message at a networked device.

FIG. 1 is a simplified block diagram illustrating one possible system of suggesting a response to an incoming message at a networked device.

A first networked device 102a communicates with a second networked device 102b and a backend 110 via a wireless network 104a and a cloud 106, or via a cellular network 104b and the cloud 106. In another embodiment, the first networked device 102a communicates via a wired interface (not shown) with the cloud 106. The first networked device 102a and the second networked device 102b are any combination of smartphones, tablets, desktop or portable computers, and wearable computers, that exchange messages via any combination of messaging applications, such as text applications, chat applications, and chatbots. Alternatively, the first networked device 102a can switch one or more times between the wireless 104a and cellular networks 104b during a session. The first networked device 102a receives an incoming message from the second networked device 102b. The first networked device 102a receives a suggested response from the backend 110, based on content and metadata of the content. The first networked device 102a sends the suggested response to the second networked device 102b.

Figure 2:
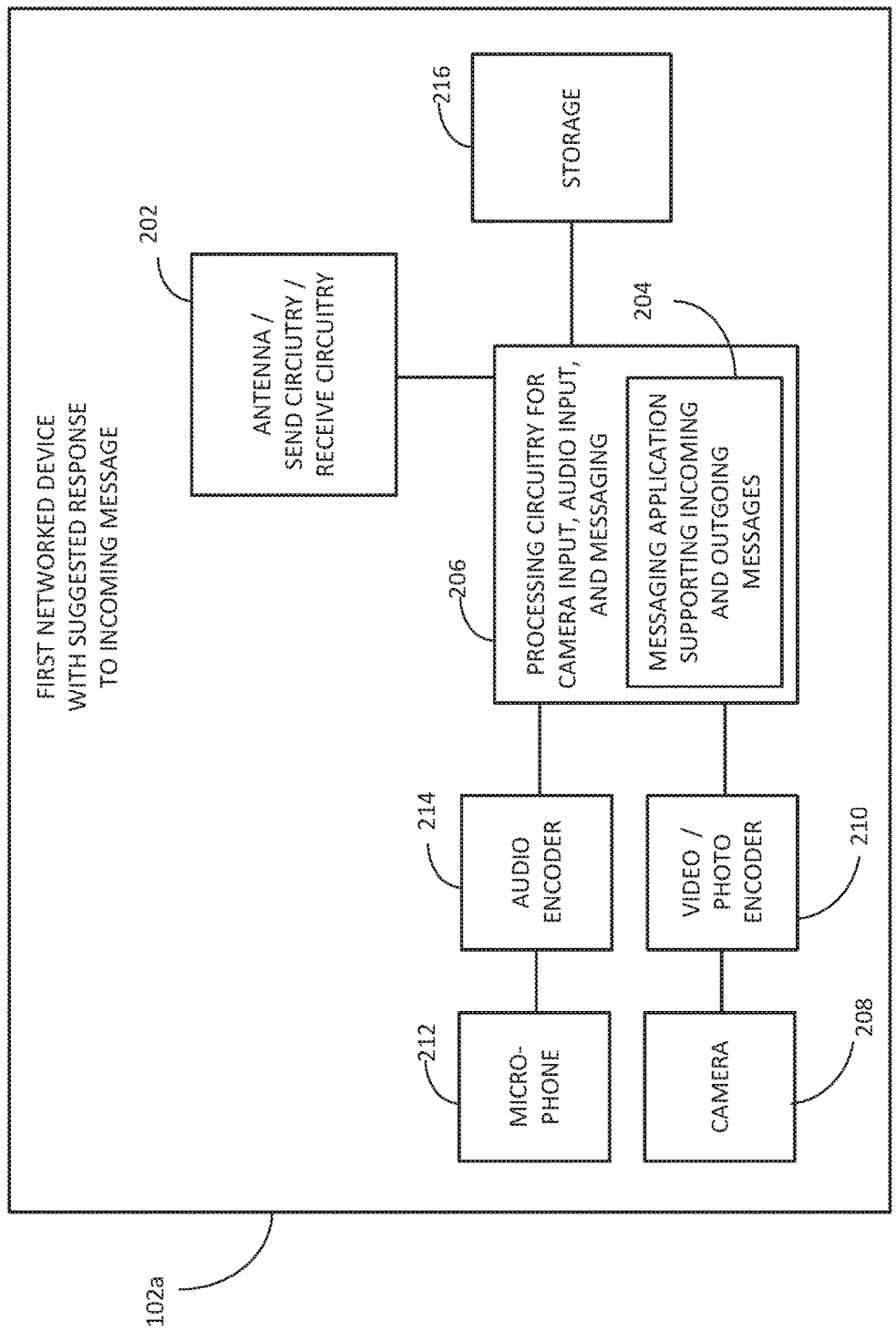
FIG. 2 is a simplified block diagram illustrating one possible networked device that suggests a response to an incoming message.

FIG. 2 is a simplified block diagram illustrating one possible networked device 102a that suggests a response to an incoming message.

The first networked device 102a exchanges incoming and outgoing messages through a network via an antenna, send circuitry, and receive circuitry 202. In another embodiment, the first networked device 102a is networked via a wired interface (not shown). A messaging application 204 that supports incoming and outgoing messaging runs on processing circuitry 206. A camera 208 receives video and/or photo data on the present state at the first networked device 102a. The video and/or photo data is processed by a video and/or photo encoder 210 and is then received by the processing circuitry 206. A microphone 212 receives audio data on the present state at the first networked device 102a. The audio data is processed by an audio encoder 214 and is then received by the processing circuitry 206. The video and/or photo data and the audio data are processed by the processing circuitry 206 to calculate a present state at the device 102a. Storage 216 holds the video and/or photo data, audio data, and incoming and outgoing messages.

Figure 3:
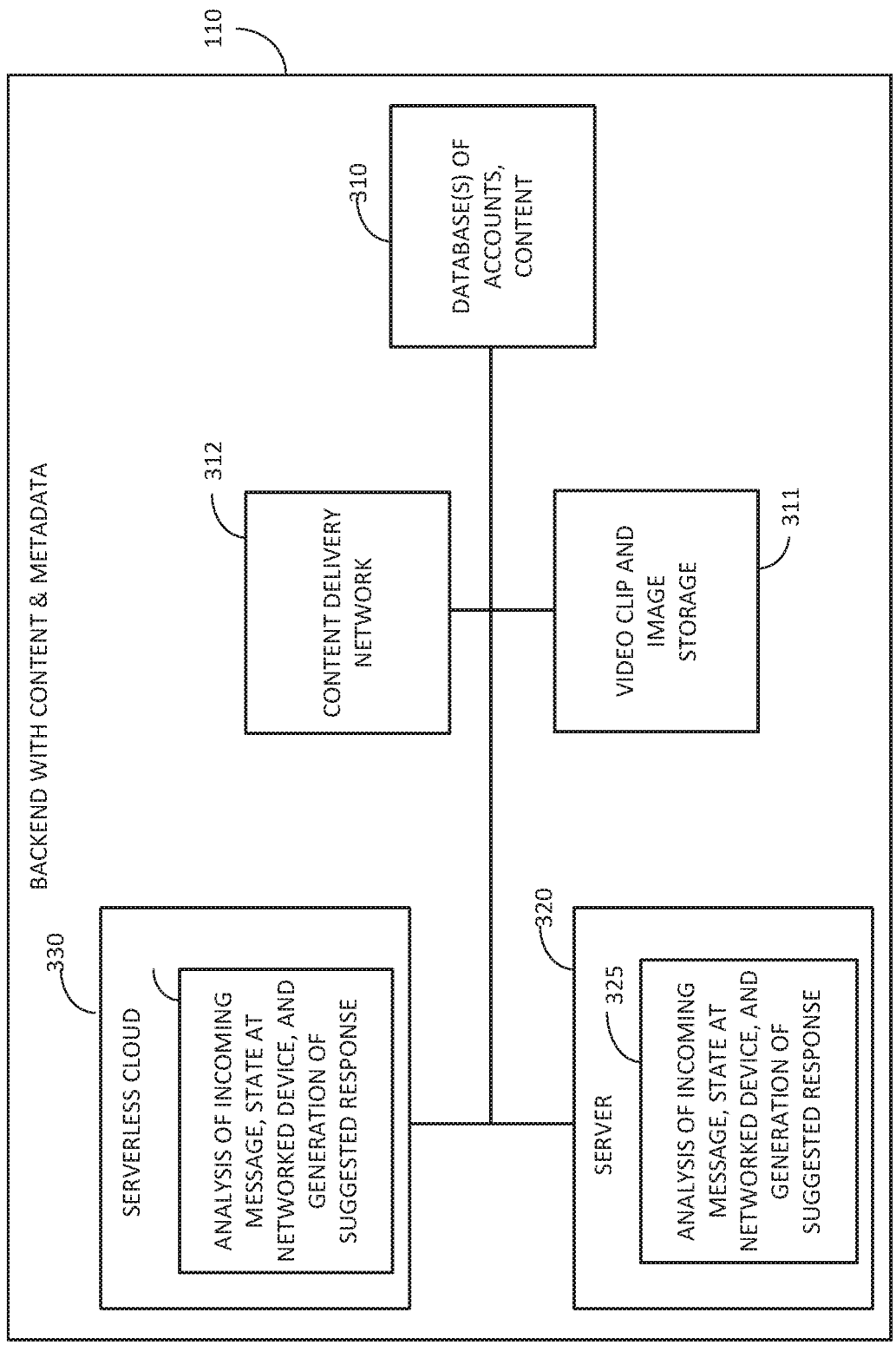
FIG. 3 is a simplified block diagram illustrating one possible backend that provides the suggested response to an incoming message at a networked device.

FIG. 3 is a simplified block diagram illustrating one possible backend 110 that provides the suggested response to an incoming message at a networked device.

Databases 310 store records of user accounts and records of content such as videos and images such as photos, for example with a schema database. The actual videos and images are held in video clip and image storage 311. A content delivery network 312 assists in timely distribution of video clips and images to networked devices. A server 320 performs analysis 325 of the incoming message at the device, the present state at the networked device that received the incoming message, and generates a suggested response. Alternatively, the server 320 is supported by a serverless cloud service. Similar cloud embodiments exist for other parts of the backend 110. For example, in another embodiment the database 310 is supported by a cloud service different than cloud service 330. In another embodiment the storage 311 is supported by a cloud service different from the cloud service 330. Other embodiments combine a mixture of cloud services with computers and devices provisioned by the user of the computers and devices.

In some embodiments, to assist the server 320 or serverless cloud 330 with generating a suggested response, the server 320 or serverless cloud 330 accesses the databases of content 310 indexed by video clip and/or image metadata, such as genre, MPAA or other movie rating, review rating, popularity, director, writer, actor/actress, date, text such as quotes from the video clip or quotes characteristic of the image, and one or more target states characterizing the video clip or image. Target states are discussed in connection with FIGS. 12-15.

Networking hardware such as routers, switches, and hubs (none of which are shown) interconnect the elements of the backend. Inputs and outputs of the elements of the backend 110 transit such networking hardware as the inputs and outputs are communicated between different elements of the backend 110.

Figure 4:
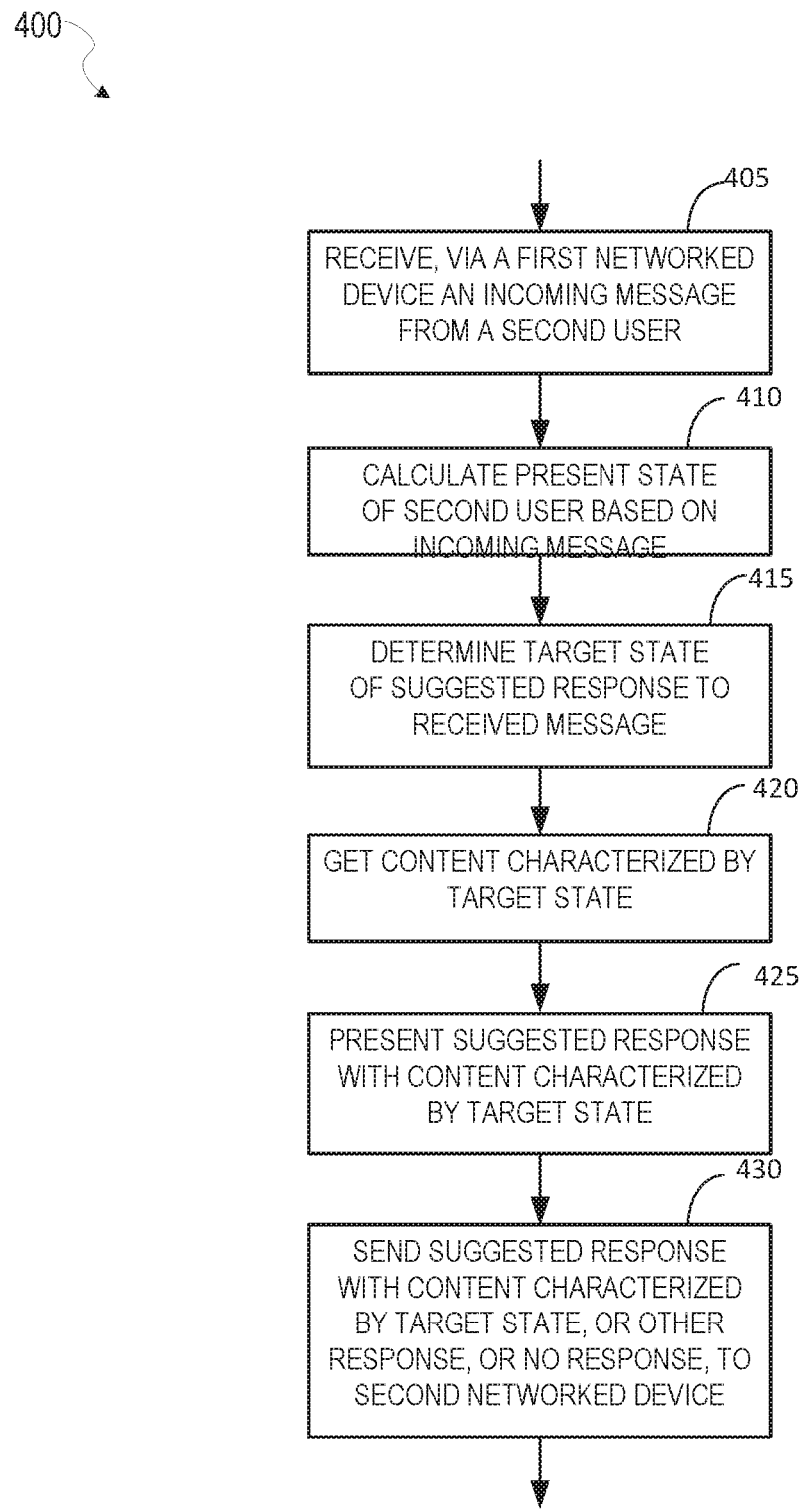
FIG. 4 is a simplified example flowchart of a process which begins with receiving a message at networked device and in which a response to the received message is suggested.

FIG. 4 is an exemplary flowchart of a process which begins with receiving a message at networked device and in which a response to the received message is suggested. In some aspects, one or more of the functions discussed below with respect to FIG. 4 may be performed by an electronic hardware processor. For example, instructions stored in an electronic hardware memory may configure the processor to perform one or more of the functions discussed below with respect to FIG. 4. In some aspects, the processor may be one or more of the processors 2410 of FIG. 26.

Block 405 receives, via a first device an incoming message from a second user. In some aspects, the second user may speak or type the incoming message. The incoming message may then be received via a microphone or keyboard and/or touchscreen respectively in these aspects. Alternatively, the incoming message may be received from a computer network. For example, in some aspects the second user may be operating a second networked device that is separated from the first networked device by a computer network. The second user may enter the incoming message into the second networked device (e.g. via audio or typed text), and the second networked device may transmit a message over the computer network to the first network device, the message indicating the incoming message.

In block 410, the first device calculates a present state of the second user based on the incoming message. The present state may be an emotional state. FIGS. 5-11 discloses embodiments of block 410. In other embodiments, the inputs for calculating the present state of the second user are sent to the backend 110. The backend 110 may then calculate the present state of the second user, and return the state information to the first device 102a, for example, via a network message indicating same.

The target state of the suggested response is determined in block 415. Various embodiments of determining target states are discussed in connection with FIGS. 12-15.

Figure 29:
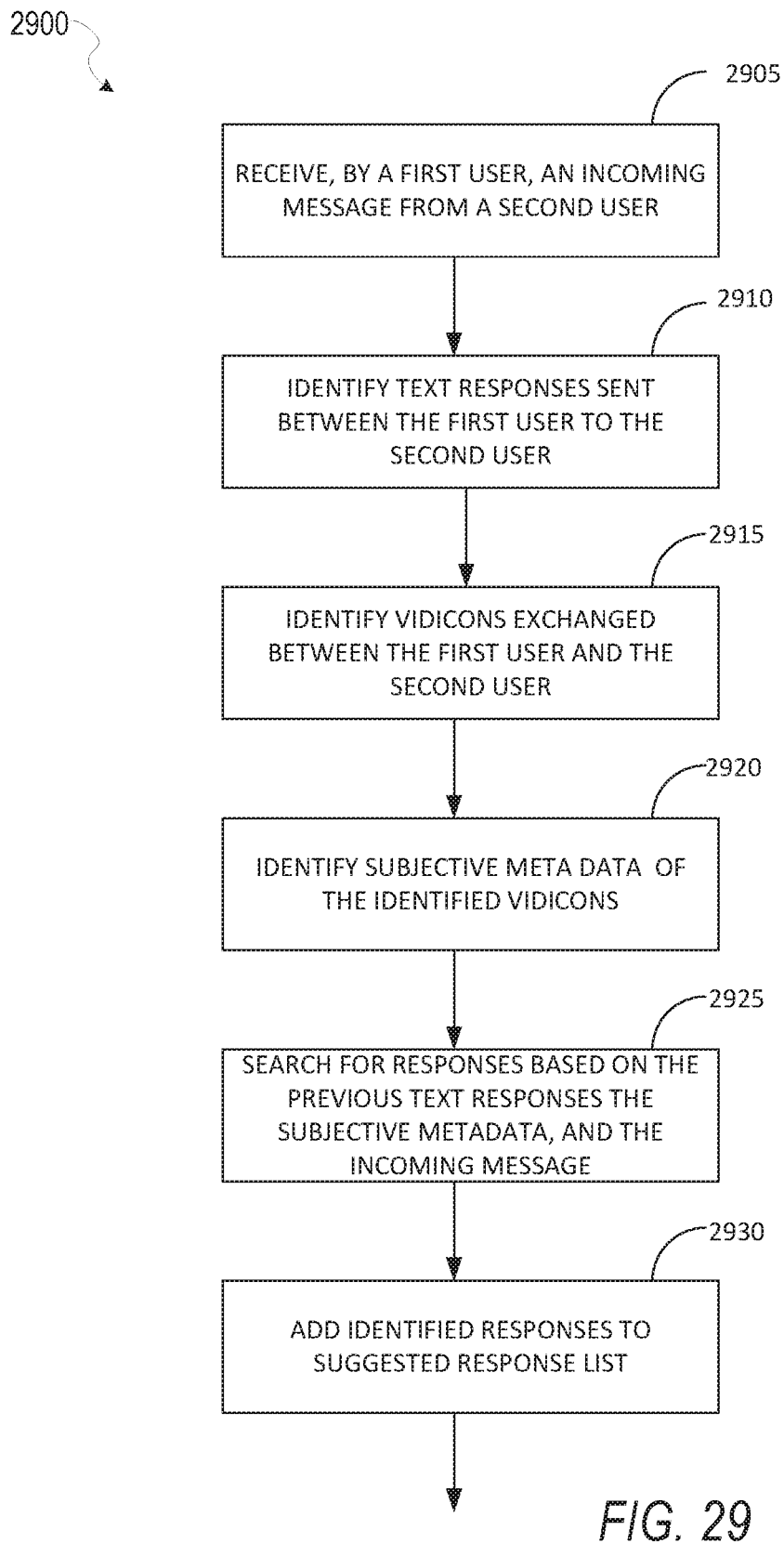
FIG. 29 is a flowchart of an exemplary method for determining a response to a message.
Figure 30:
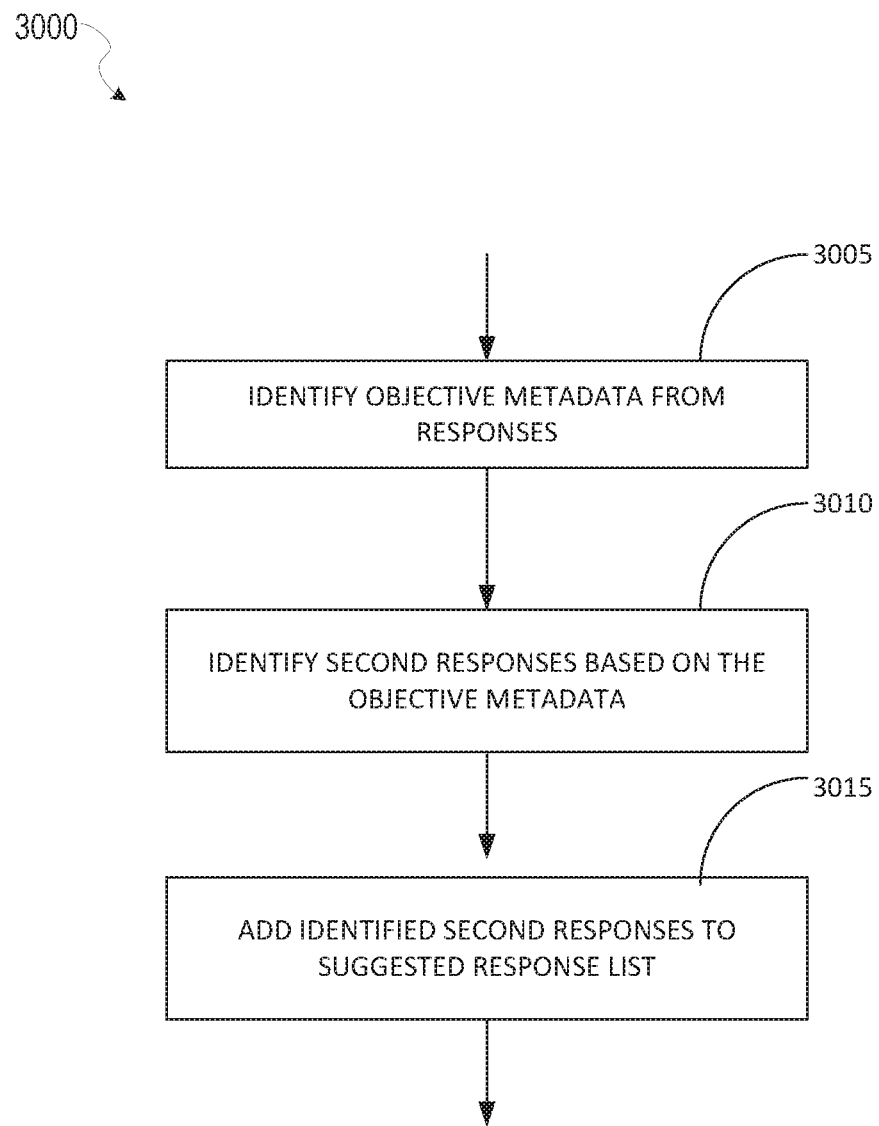
FIG. 30 is an exemplary method for identifying possible responses to an incoming message.
Figure 31:
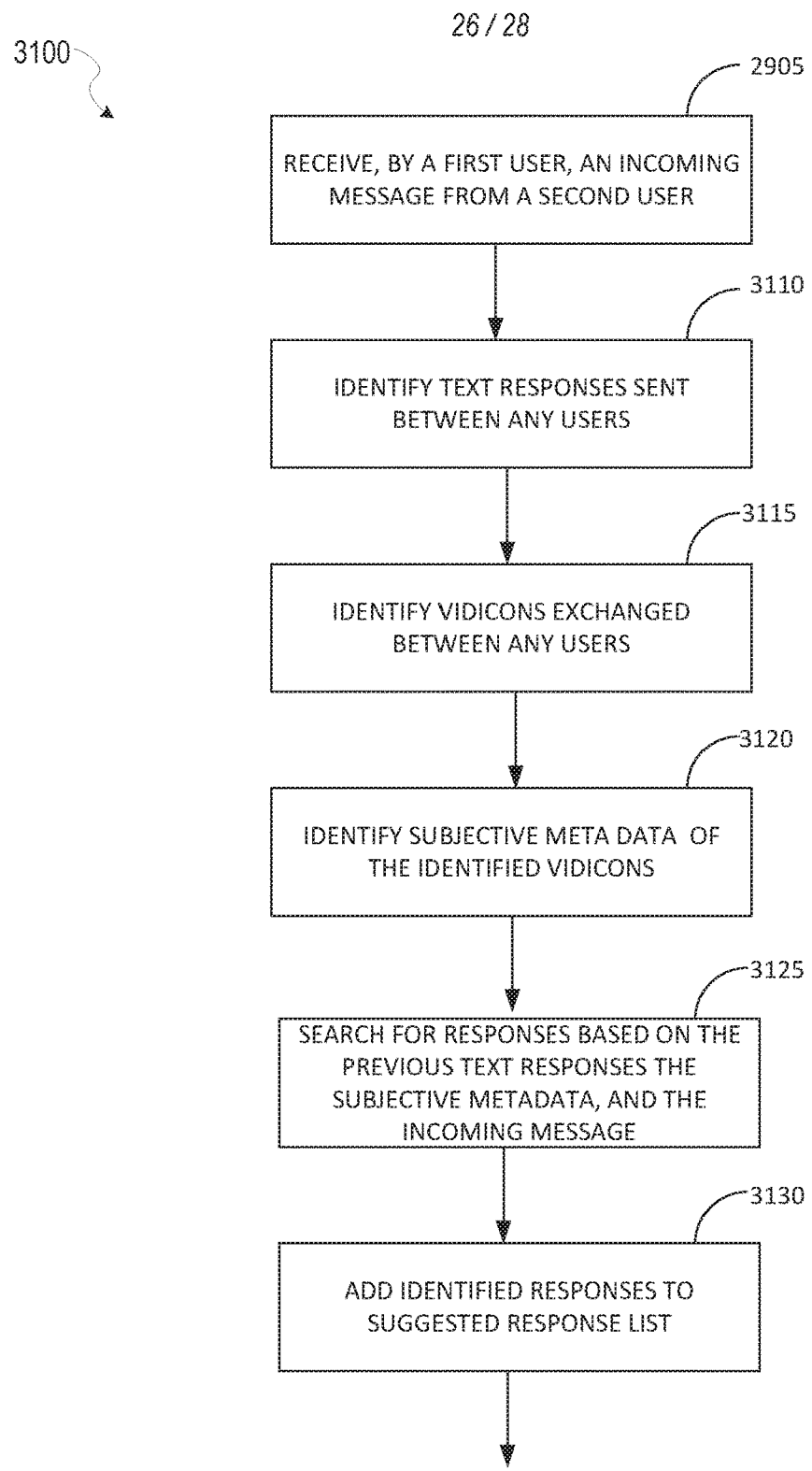
FIG. 31 is a flowchart of an exemplary method of identifying responses to an incoming message.

In block 420, content characterized by the target state is determined by the first device. In some aspects, the content may include possible responses to the incoming message. FIGS. 29-31 below describe some embodiments of obtaining content based on the target state.

In block 425, the first device writes data to an output device. The data may be derived from the content determined in block 420. In some aspects, the output device may be an electronic display or an audio speaker. In some aspects, block 425 may play a video response, such as a vidicon, which may write data both to the electronic display and the speaker.

Some aspects of block 425 present suggested response(s) derived from the determined content characterized by the target state in block 420 on a user interface of the first device. In some aspects, input may be received selecting one of the suggested response(s). The data written to the output device may be derived from the selected response.

In some aspects of process 400, block 430 sends one of the suggested response(s) to the second networked device 102b, after a choice of that suggested response. Alternatively, none of the suggested response(s) is/are chosen, and a different response is sent from the first networked device to the second networked device. Alternatively, no response is sent from the first networked device 102a to the second networked device 102b.

Figure 5:
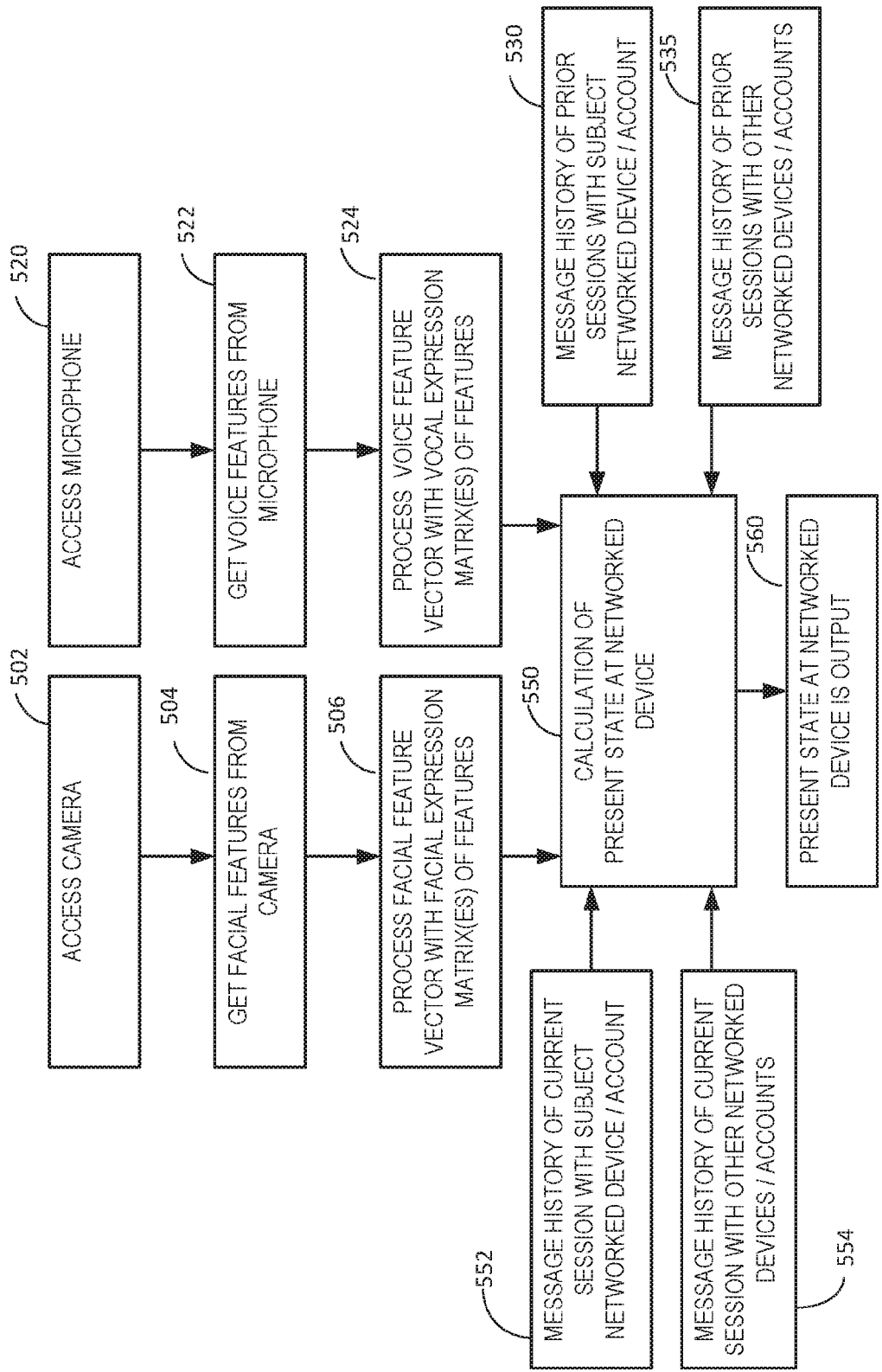
FIG. 5 is a simplified diagram of receiving various inputs and calculating the present state at a networked device that receives the message.

FIG. 5 is a simplified diagram of receiving various inputs and calculating the present state at a networked device that receives the message.

For camera input, a camera of the networked device is accessed in block 502. Facial features are extracted from the resulting video or photos in block 504. A facial feature vector is formed from the extracted facial features in block 506. The facial feature vector is processed with a facial expression matrixes of features, or alternatively matrixes of features. For example, a product of the facial feature vector and the facial expression matrix of features results in a product vector indicative of the facial expression in the source video or photos. An example is shown at FIGS. 6-8.

For microphone input, a microphone of the networked device is accessed in block 520. Vocal features are extracted from the resulting audio in block 522. A vocal feature vector is formed from the extracted vocal features in block 524. In some aspects, the vocal feature vector is processed with vocal expression matrix, or alternatively matrixes of features. For example, a product of the vocal feature vector and the vocal expression matrix of features results in a product vector indicative of the vocal expression in the source audio. An example is shown at FIGS. 9-11.

A present state of the networked device is determined in block 550. Block 550 determines the state of the networked device based on one or more of the facial feature vector with facial expression matrix(es) of features from block 506, the voice feature vector with vocal expression matrix(es) of features from block 524, prior sessions with the subject networked device 530, as well as other networked devices with the subject networked device, and as well as other networked devices not including the subject networked device 525. In some embodiments, heuristic analysis of the message histories provides an estimate of the present state at the subject networked device. For example, heuristic analysis finds historical messaging patterns in prior sessions that are similar to the current message pattern of the subject networked device, and then indicates the state that resulted in the historical messaging patterns. This state that resulted in the historical messaging patterns is an estimate of the present state at the subject networked device.

Other input sources are the messages histories of present sessions with the subject networked device 552, as well as other networked devices 554. Because the sessions are ongoing rather than historical, in some embodiments heuristic analysis will not have had sufficient time to be reliable absent additional time and/or data. Nevertheless, a widespread event or a widely known contemporary event is expected to be the subject of many current sessions, and is expected to trigger a similar state in many current sessions.

In some embodiments, the start (first messaging)/restart (first messaging after a lapse) adds a requirement to bias the content filtering towards similar language pattern events.

In some embodiments, an abbreviated heuristic analysis is performed of the message histories in current sessions with the subject networked device or other networked devices. Despite the relatively low reliability of abbreviated heuristic analysis standing alone, proximity of geography or proximity of interest between the subject networked device and the widespread event or a widely known contemporary event is sufficient to compensate. For example, abbreviated heuristic analysis finds messaging patterns that are similar to the current message pattern of the subject networked device, and adds analysis based on present state data that is typically associated with the widespread event or widely known contemporary event. The state that resulted with other networked devices is an estimate of the present state at the networked device, in the event of proximity of geography or proximity of interest between the subject networked device and other networked devices.

In view of the various inputs, the present state at the networked device is calculated. In some embodiments, the weights of various inputs are adjusted based on historical reliability with the subject networked device and/or other networked devices. In other embodiments, the weights of various inputs are adjusted periodically, or are static.

FIGS. 6-8 are simplified mathematical steps for an input, based on facial expression, to calculate the present state at a networked device that receives the message.

FIG. 6 is an example facial expression matrix 600 with rows that correspond to various facial expressions that are each indicative of a present state at the networked device. In some embodiments, the various columns of the facial expression matrix correspond to particular facial features such as eyebrows, eyelids, eyes, nostrils, cheeks, lips, and mouth. In other embodiments, the various columns of the facial expression matrix correspond to particular spatial regions of the video or photo, where the photo has been scaled to be comparable to other photos. In some embodiments, the facial expression matrix 600 is derived from training with a variety of faces having a variety of facial expressions that indicate different states.

FIG. 7 is an example facial feature vector 700 derived from camera input. In some embodiments, the various columns of the facial feature vector correspond to particular facial features such as eyebrows, eyelids, eyes, nostrils, cheeks, lips, and mouth. In other embodiments, the various columns of the facial feature vector correspond to particular spatial regions of the video or photo, where the photo has been scaled to be comparable to other photos.

FIG. 8 shows a vector product 800 of the facial expression matrix 600 and the facial feature vector 700. In some embodiments, the facial feature vector 700 has entries that indicate the relative likelihood that the facial expression in the video or photo from the camera input corresponds to a particular facial expressions that is indicative of a particular present state.

FIGS. 9-11 are simplified mathematical steps for an input, based on vocal expression, to calculate the present state at a networked device that receives the message.

FIG. 9 is an example vocal expression matrix 900 with rows that correspond to various vocal expressions that are each indicative of a present state at the networked device. In some embodiments, the various columns of the vocal expression matrix correspond to particular volumes, volume changes, audio frequencies, audio frequency changes, speaking speed, and/or speaking speed changes. In some embodiments, the vocal expression matrix 900 is derived from training with a variety of voices having a variety of vocal expressions that indicate different states.

FIG. 10 is an example vocal feature vector 1000 derived from microphone input. In some embodiments, the various columns of the vocal feature vector 1000 correspond to particular volumes, volume changes, audio frequencies, audio frequency changes, speaking speed, and/or speaking speed changes.

FIG. 11 is the vector product 1100 of the vocal expression matrix 900 and the vocal feature vector 1000. In some embodiments, the vocal feature vector 1000 has entries that indicate the relative likelihood that the vocal expression in the audio from the microphone input corresponds to a particular vocal expression that is indicative of a particular present state.

FIGS. 12-14 are simplified state scales that shows relative positions of a present state at the networked device that received the incoming message, and a target state of the suggested response to an incoming message.

One example of a state scale orders states of emotions as follows, in order from a highest state of emotion to a lowest state of emotion: joy/knowledge/empowerment/freedom/ love appreciation; passion; enthusiasm; positive expectation belief; optimism; hopefulness; contentment; boredom; pessimism; frustration/irritation/impatience; a state of being overwhelmed; disappointment; doubt; worry; blame; discouragement; anger; revenge; hatred/rage; jealousy; insecurity/guilt/unworthiness; and fear/grief/depression/powerlessness/victim. Other examples reorder, change, add, and/or remove states of emotions.

FIG. 12 shows an exemplary state scale 1200. The state scale 1200 shows a target state of emotion at the networked device at a higher state than the present state of emotion at the networked device. For example, with reference to the example state scale 1200, if the present state of emotion at the networked device is contentment, then the target state of emotion at the networked device is hopefulness or a higher state of emotion.

FIG. 13 shows an exemplary state scale 1300. The state scale 1300 shows a target state of emotion at the networked device at a lower state than the present state of emotion at the networked device. For example, with reference to the example state scale 1300, if the present state of emotion at the networked device is hopefulness, then the target state of emotion at the networked device is contentment or a lower state of emotion.

FIG. 14 shows an exemplary state scale 1400. The state scale 1400 shows a target state of emotion at the networked device at a same state as the present state of emotion at the networked device. For example, with reference to the example state scale above, if the present state of emotion at the networked device is hopefulness, then the target state of emotion at the networked device is hopefulness.

In some embodiments, whether a particular embodiment follows the general strategy of one of FIGS. 12-14 is determined by whether the suggested reply follows a messaging pattern such as escalation/amplification (the suggested reply "tops" the incoming message), deflection (change of subject), boredom (obvious disinterest), or emotional intelligence (the other party matches or positively/negatively escalates the state of emotion of the messaging session).

Figure 15:
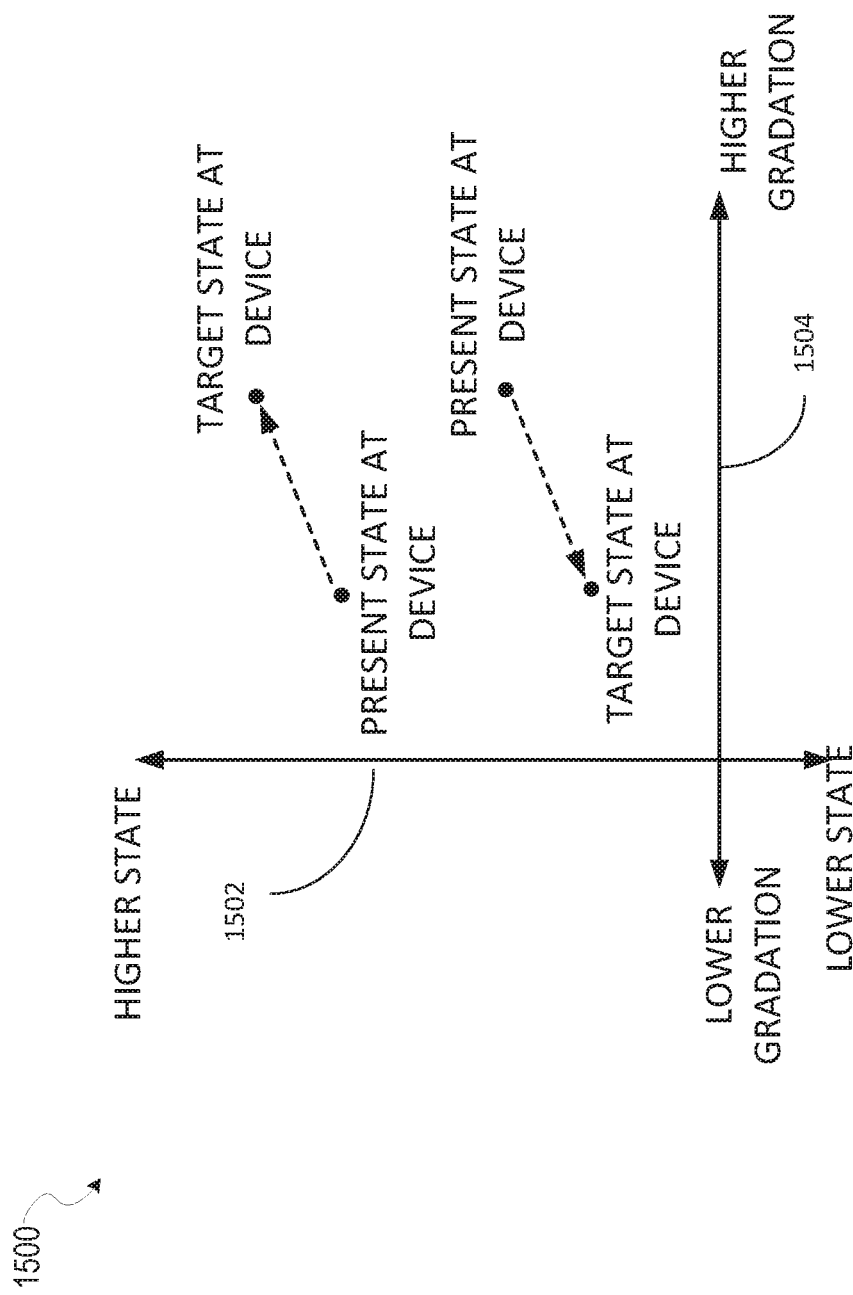
FIG. 15 is a simplified state scale graph in 2 dimensions that shows relative positions of a present state at the networked device that received the incoming message, and a target state of the suggested response to an incoming message.

FIG. 15 is exemplary graph 1500 illustrating relative positions of a present state at the networked device that received the incoming message, and a target state of the suggested response to an incoming message.

In the illustrated embodiment, the graph 1500 has a first axis 1502 that is similar to the 1-dimensional state scale of FIGS. 12-14. The graph 1500 is shown with a second axis 1504 with gradations of a particular state on the first axis. In one embodiment, such gradations are magnitudes of the particular state on the first axis. In another embodiment, such gradations are secondary emotions. In yet another embodiment, the graph has 3 or more dimensions, and the graph has a third axis with tertiary emotions.

The following example list has the format of Primary emotion; Secondary emotion(s); Tertiary emotion(s).

Love; Affection; Adoration, affection, love, fondness, liking, attraction, caring, tenderness, compassion, sentimentality
Lust; Arousal, desire, lust, passion, infatuation
Longing; Longing
Joy; Cheerfulness; Amusement, bliss, cheerfulness, gaiety, glee, jolliness, joviality, joy, delight, enjoyment, gladness, happiness, jubilation, elation, satisfaction, ecstasy, euphoria
Zest; Enthusiasm, zeal, zest, excitement, thrill, exhilaration
Contentment; Contentment, pleasure
Pride; Pride, triumph
Optimism; Eagerness, hope, optimism
Enthrallment; Enthrallment, rapture
Relief; Relief
Surprise; Surprise; Amazement, surprise, astonishment
Anger; Irritation; Aggravation, irritation, agitation, annoyance, grouchiness, grumpiness
Exasperation; Exasperation, frustration
Rage; Anger, rage, outrage, fury, wrath, hostility, ferocity, bitterness, hate, loathing, scorn, spite, vengefulness, dislike, resentment
Disgust; Disgust, revulsion, contempt
Envy; Envy, jealousy
Torment; Torment
Sadness; Suffering; Agony, suffering, hurt, anguish
Sadness; Depression, despair, hopelessness, gloom, glumness, sadness, unhappiness, grief, sorrow, woe, misery, melancholy
Disappointment; Dismay, disappointment, displeasure
Shame; Guilt, shame, regret, remorse
Neglect; Alienation, isolation, neglect, loneliness, rejection, homesickness, defeat, dejection, insecurity, embarrassment, humiliation, insult
Sympathy; Pity, sympathy
Fear; Horror; Alarm, shock, fear, fright, horror, terror, panic, hysteria, mortification In other embodiments, the tertiary emotions are removed or combined with the secondary emotions.

Figure 16:
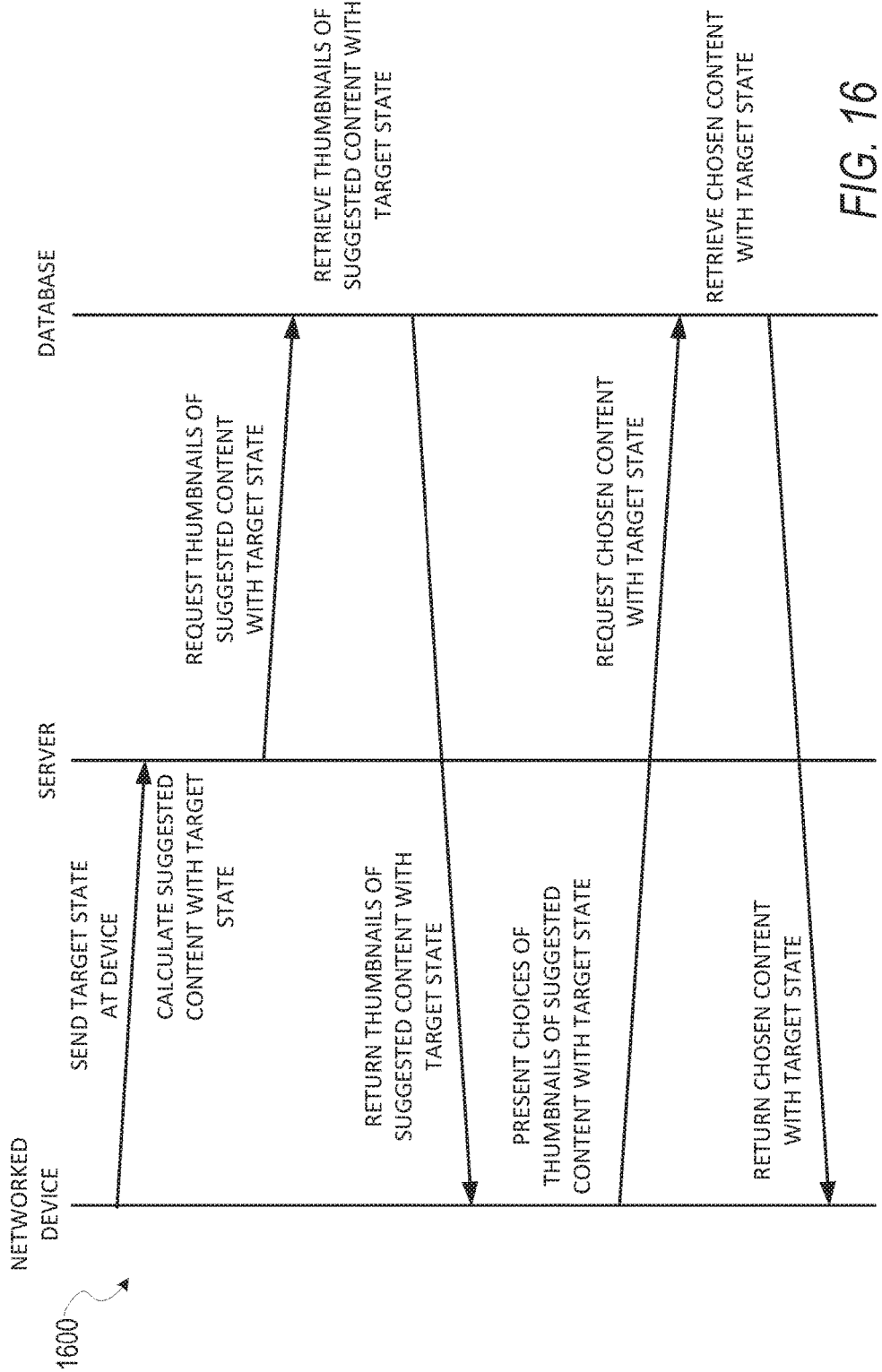
FIG. 16 is a simplified bounce diagram showing retrieval of thumbnails of suggested content with the target state, followed by retrieval of the chosen content with the target state.

FIG. 16 is exemplary message sequence diagram 1600 showing retrieval of thumbnails of suggested content with the target state, followed by retrieval of the chosen content with the target state.

A networked device sends the target state at the networked device to a server. The server calculates suggested content such as video clip content with the target state. The server builds a maximum likelihood tree of content with the target state, based on metrics such as the following:

Replies between a pair of users;
Replies between any pair of users;
State of emotion measured from at the networked device receiving the incoming message;
Metadata of video clip;
Tags/text of content (such as voice-to-text transcription) used in video clip;
Primary/secondary state of emotion keyword;
Title/year of content;
Writer/composer/director/actors/etc. of content;
User attributes/demographics (male, female, child, etc.);
Conversation pattern (amplification/deflection/etc.); and
User preference or default (use of profanity, intensity scale, genre preference such as action/adventure/animation/biography/comedy/crime/documentary/drama/family/fantasy/film-noir/history/horror/music/musical/mystery/romance/science fiction/sport/thriller/war/western, or character type preference such as cartoon/male/female/alien/cartoon).

Some embodiments more heavily weight different metrics in multiple iterations to return different content in multiple iterations.

The server requests thumbnails of suggested content with the target state. The database retrieves thumbnails of the suggested content with the target state. In some embodiments, the database content is labeled with metrics or with attributes corresponding to the target state to allow faster retrieval. In other embodiments, rather than thumbnails the complete content is requested and retrieved.

The thumbnails of the suggested content are returned to the networked state. The networked device presents choices of the thumbnails of suggested content with the target state. In response to user choice at the networked device of the suggested content, the networked device requests the chosen content with the target state from the database, directly or via the server. The database retrieves the chosen content with the target state, and returns the chosen content with the target state to the networked device.

In other embodiments with content that is sufficiently small data size to present tolerable latency, the thumbnail steps are skipped.

Figure 17:
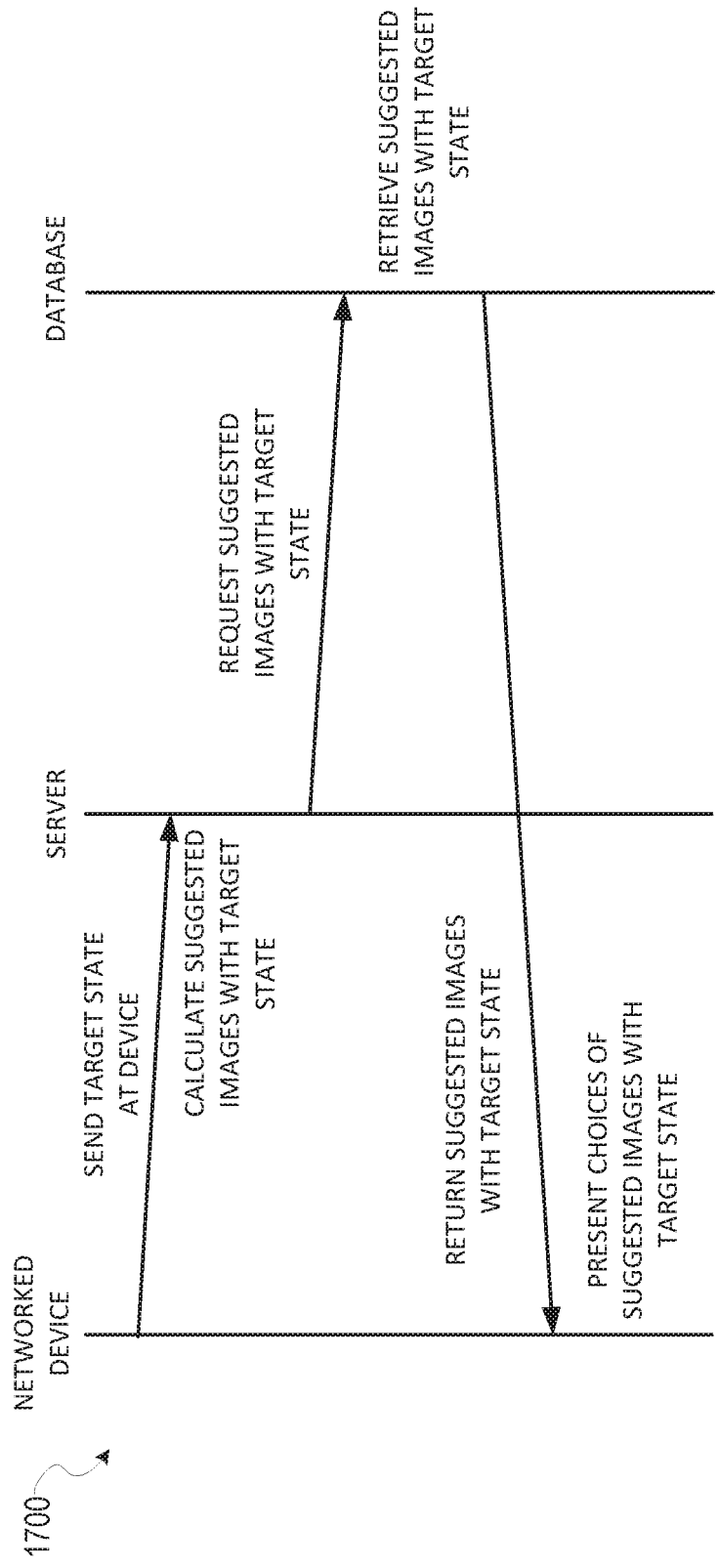
FIG. 17 is a simplified bounce diagram showing retrieval of suggested images with the target state.

FIG. 17 is an exemplary message sequence diagram 1700 showing retrieval of suggested images with the target state. The sequence diagram 1700 shows a networked device sends the target state at the networked device to a server. The server calculates suggested image content with the target state. The server builds a maximum likelihood tree of image content with the target state, based on metrics listed elsewhere. In various embodiments, communication is asynchronous or real-time.

The server requests the suggested image content with the target state. The database retrieves the suggested image content with the target state, and returns the suggested image content with the target state to the networked device.

In other embodiments with image content that has sufficiently large data size to present intolerable latency, thumbnail image steps are added before retrieving the actual full size suggested image content.

Some embodiments more heavily weight different metrics in multiple iterations to return different content in multiple iterations.

Figure 18:
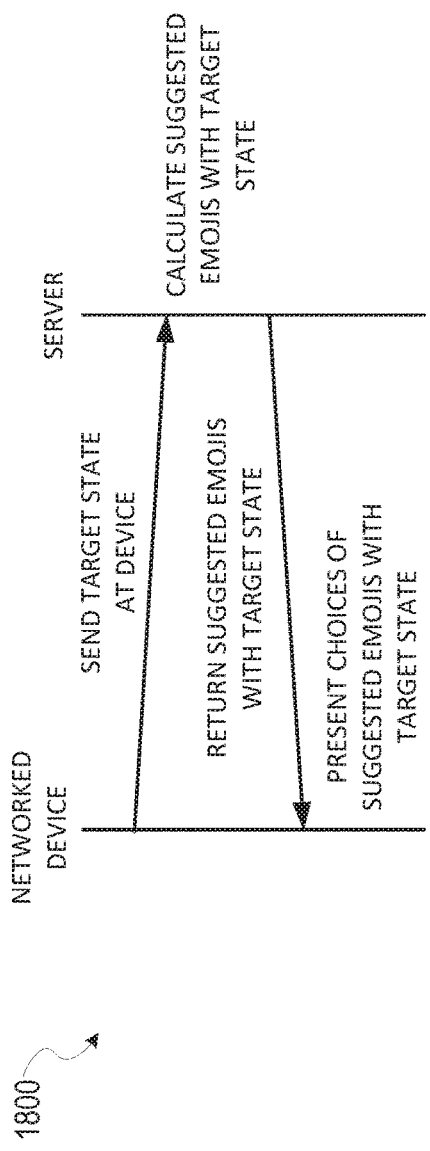
FIGS. 18-19 are simplified bounce diagrams showing retrieval of suggested emojis or suggested emoji identifiers with the target state.
Figure 19:
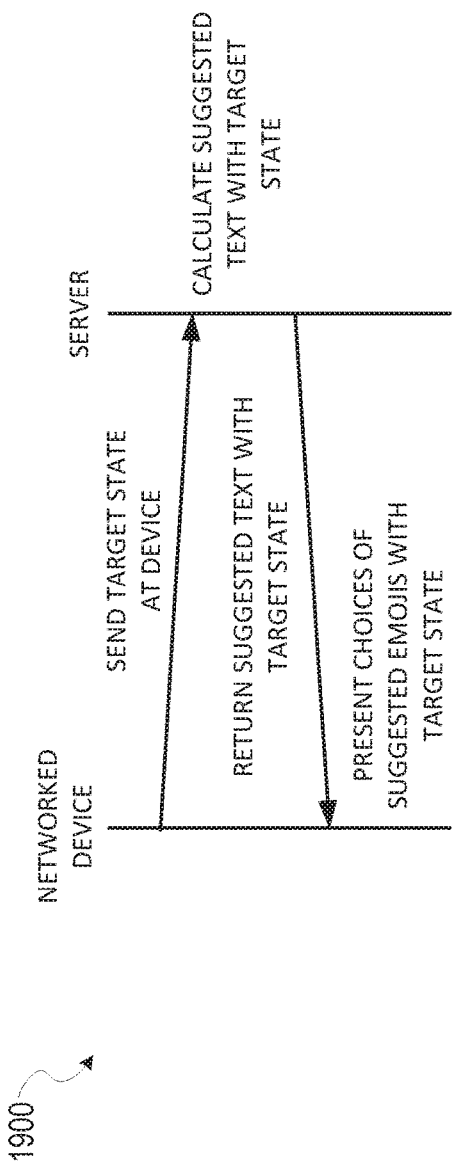

FIGS. 18-19 are exemplary message sequence diagrams showing retrieval of suggested emojis or suggested emoji identifiers with the target state.

In FIG. 18, a networked device sends the target state at the networked device to a server. The server calculates suggested emojis with the target state. The server builds a maximum likelihood tree of emojis with the target state, based on metrics listed elsewhere. The server returns the suggested emojis with the target state to the networked device. In some embodiments, the calculation of suggested emojis occurs at the networked device and omits a round of interaction with the server. Some embodiments more heavily weight different metrics in multiple iterations to return different content in multiple iterations.

In FIG. 19, a networked device sends the target state at the networked device to a server. The server calculates suggested text with the target state. The server builds a maximum likelihood tree of texts with the target state, based on metrics listed elsewhere. The server returns the suggested texts with the target state to the networked device. In some embodiments, the calculation of suggested texts occurs at the networked device and omits a round of interaction with the server. Some embodiments more heavily weight different metrics in multiple iterations to return different content in multiple iterations.

Figure 20:
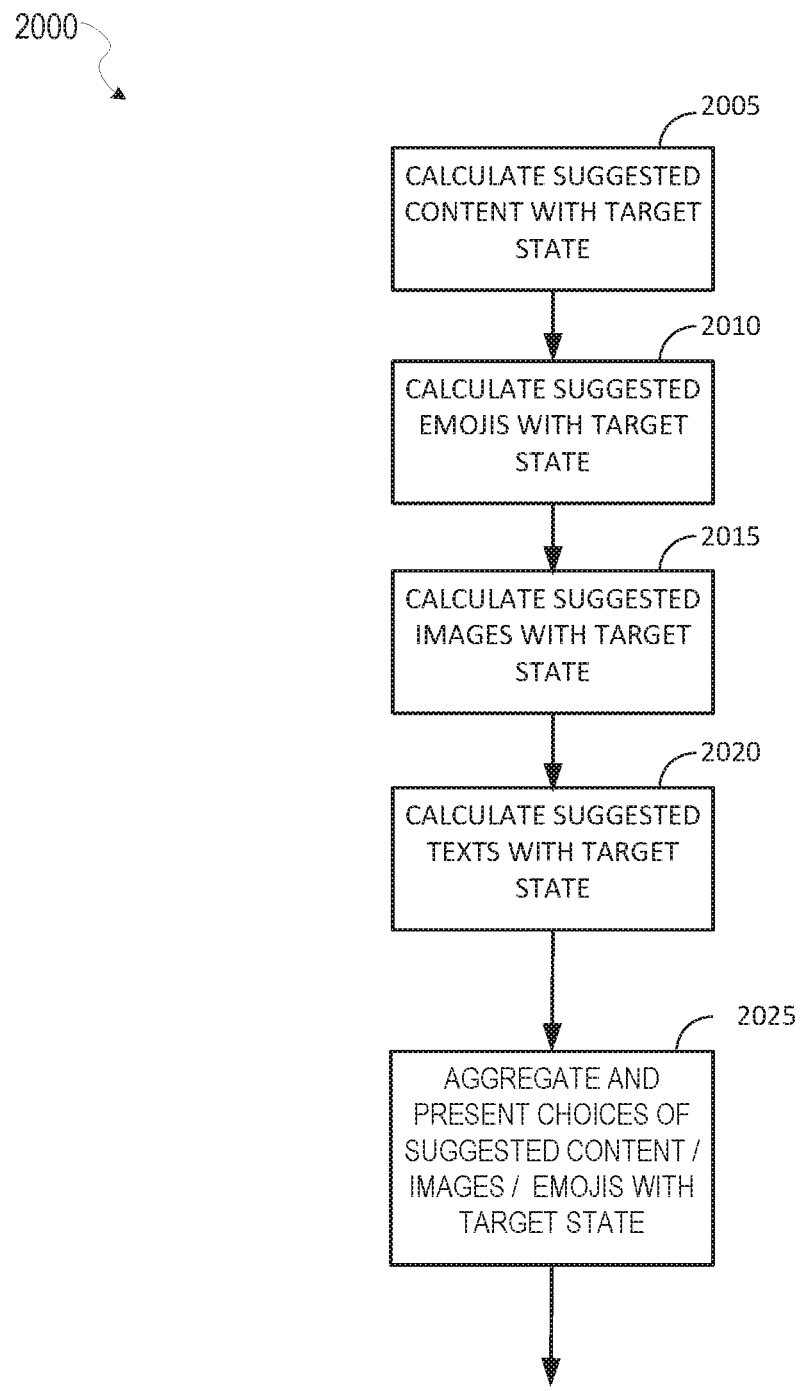
FIG. 20 is a simplified process flow showing the aggregation of suggested content, images, and emojis to present as choices at the networked device that received the incoming message.

FIG. 20 is an exemplary process flow showing the aggregation of suggested content, images, emojis, and texts to present as choices at the networked device that received the incoming message. Various embodiments combine two or more of suggested content such as video clips, images, emojis, and texts and present an aggregation as suggested responses to an incoming message.

In block 2005, suggested content with a target state is identified. In block 2010, suggested emojis with the target state are identified. In block 2015, images with the target state are identified. In block 2020, texts with the target state are identified. Block 2025 aggregates the identified suggestions and presents the suggestions as choices.

Figure 21:
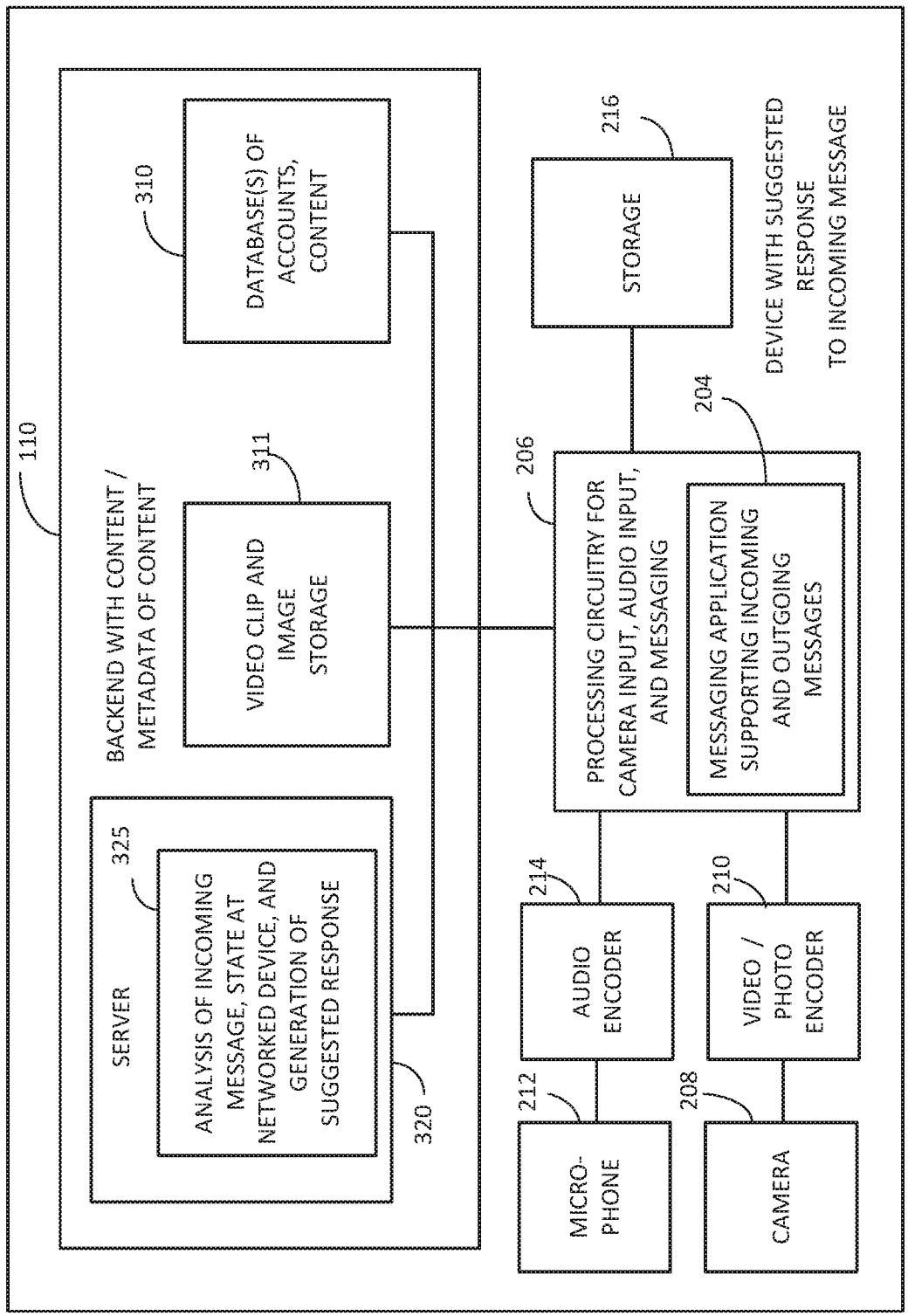
FIG. 21 is a block diagram illustrating an example of a machine that communicates with a user and contains both the user communication interface and a local backend.

FIG. 21 is a block diagram of an exemplary user device 102*a* that communicates with a user and contains both the user communication interface and a local backend. In some embodiments, the machine has periodic updates of the database, server logic, video clip and image storage, response messages, and/or response emojis. In other embodiments, the machine has no updates of the database, server logic, video clip and image storage, response messages, and response emojis.

Figure 22:
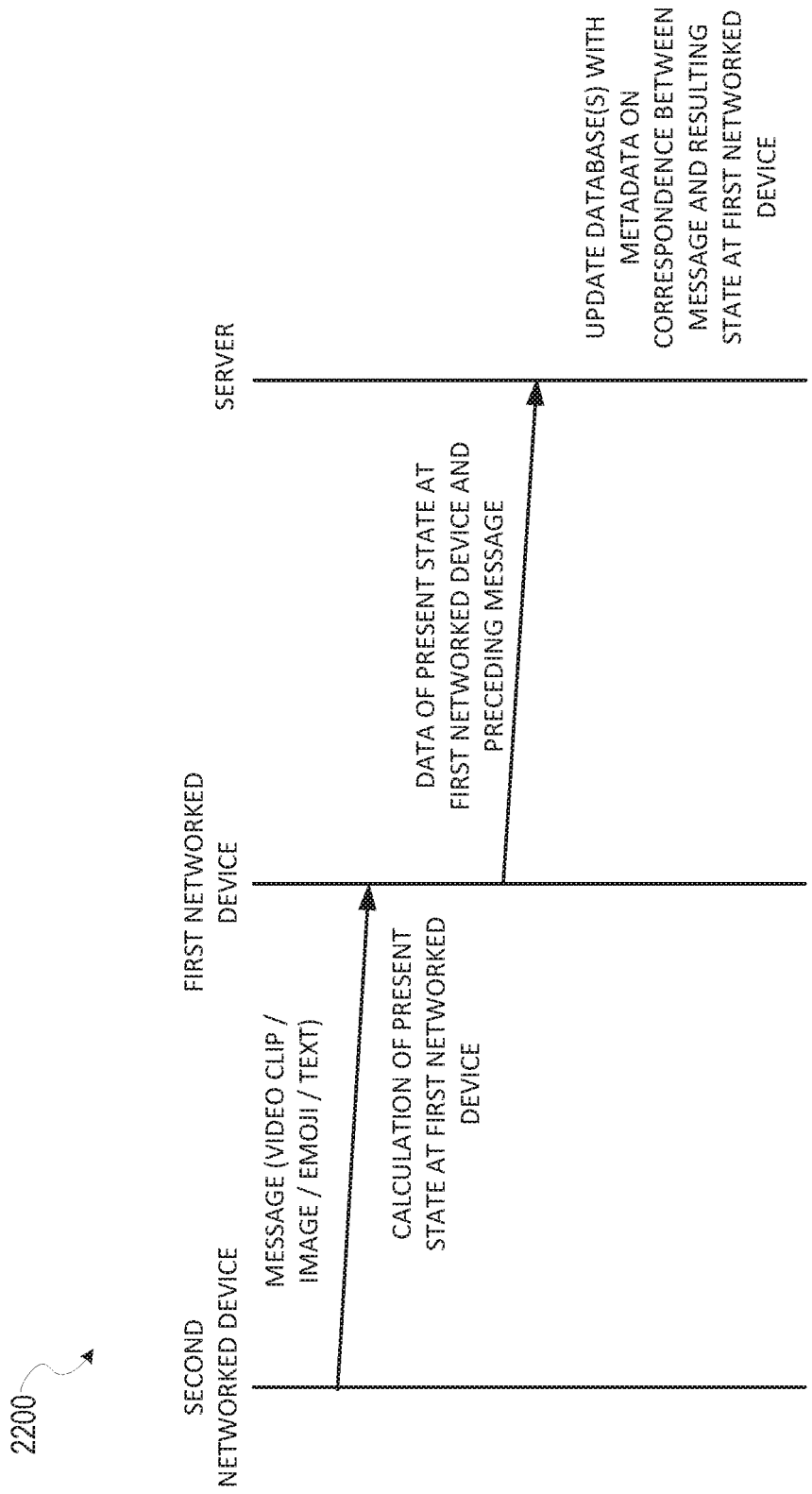
FIGS. 22-23 are simplified bounce diagrams showing that the present state at a networked device, in response to a message, is sent to the server to update metadata.
Figure 23:
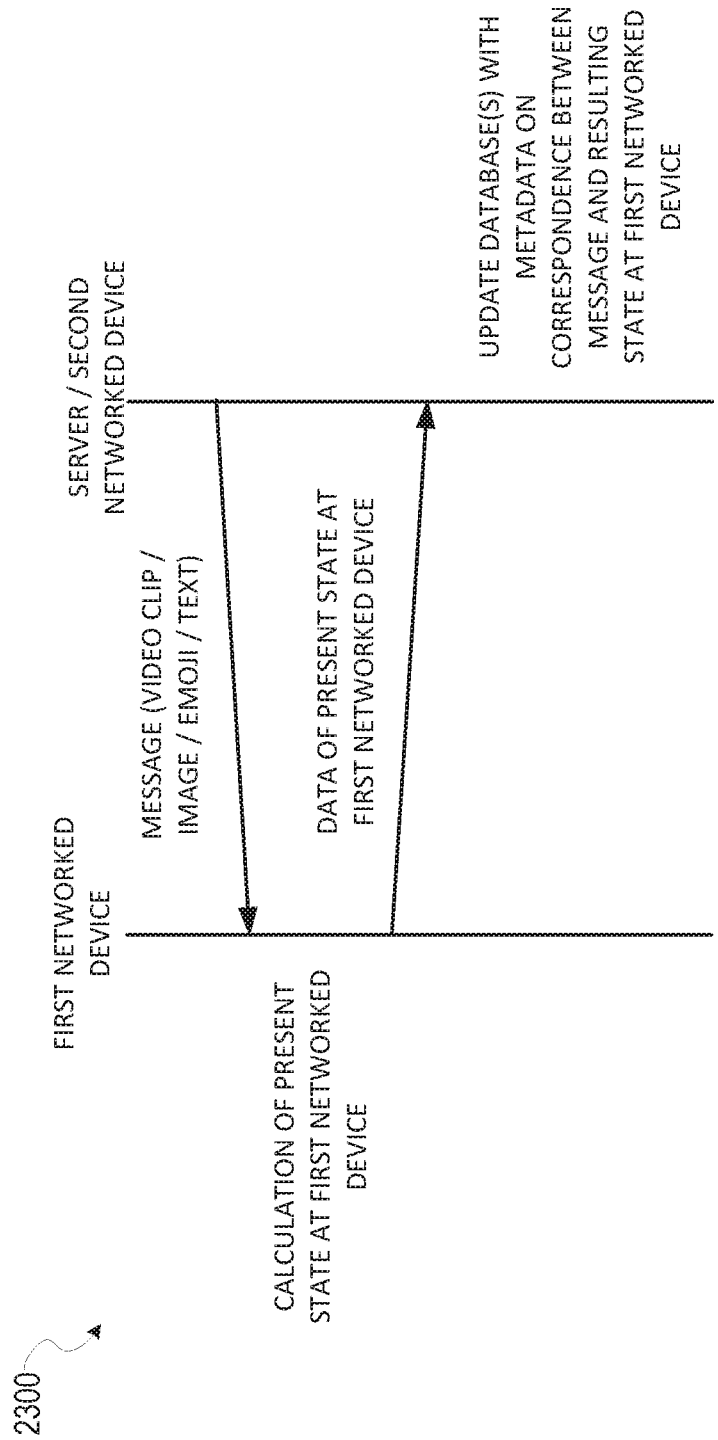

FIGS. 22-23 are exemplary message sequence diagrams 2200 and 2300, each showing messages exchanged between the second network device, first networked device, and server.

In FIG. 22, a message, including one or more of a video clip, image, emoji, or text, is received at the first networked device from the second networked device. The present state at the first networked device is calculated, for example according to FIG. 5. Data about the present state at the first networked device in response to the message is sent from the first networked device to the server. Data about the preceding message is also sent from the first networked device to the server. The server updates the backend databases with metadata about the correspondence between the message and the resulting state.

FIG. 23 is similar to FIG. 22 except that the server and the second networked device are the same.

Figure 24:
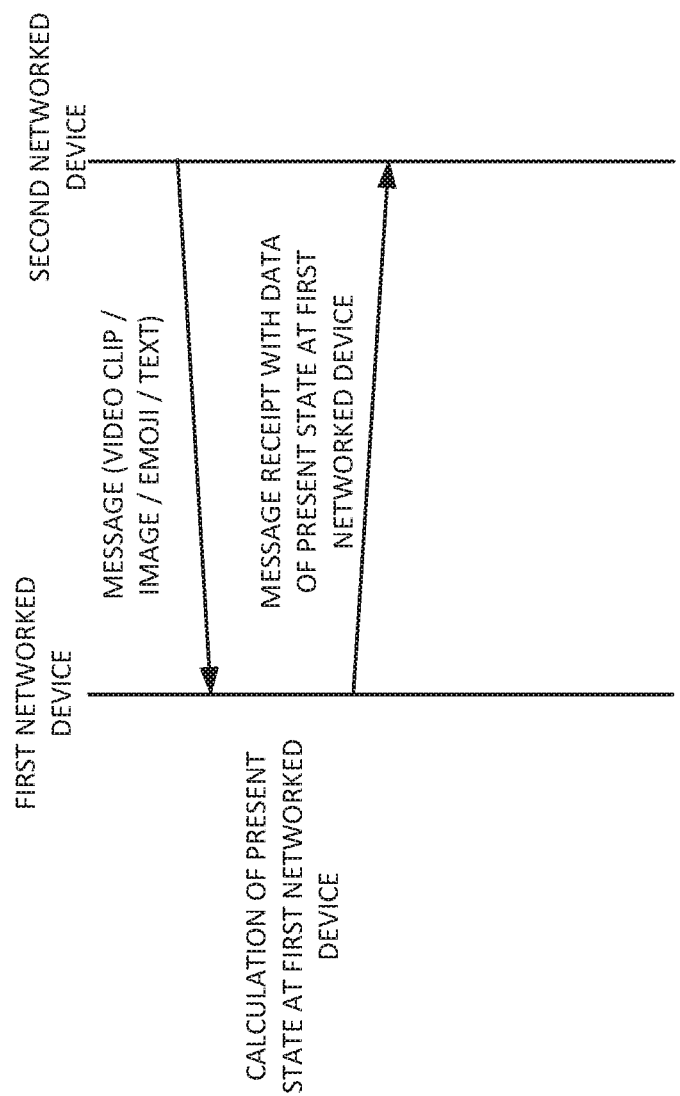
FIG. 24 is a simplified bounce diagram showing that a message receipt with data of the present state at a networked device, in response to a message, is sent back to the second device that sent the original message.

FIG. 24 is an exemplary message sequence diagram showing that a message receipt with data of the present state at a networked device, in response to a message, is sent back to the second device that sent the original message.

A first networked device receives a message from a second network device. The message may include media including one or more of a video clip, an image, an emoji, and text. The present state at the network device is calculated. The first network device returns a read receipt to the second network device. The read receipt is media including one or more of a video clip, an image, an emoji, and text; and the media corresponds to the present state that was calculated at the network device in response to the message from the second networked device. In some embodiments, the media is retrieved from a database. In other embodiments, the media is retrieved from within the first network device. In some embodiments, the particular type of media and/or the particular instance of the media are selectable with the first networked device. In other embodiments, the particular type of media and/or the particular instance of the media are determined by presets or by the second network device or by a server.

Figure 25:
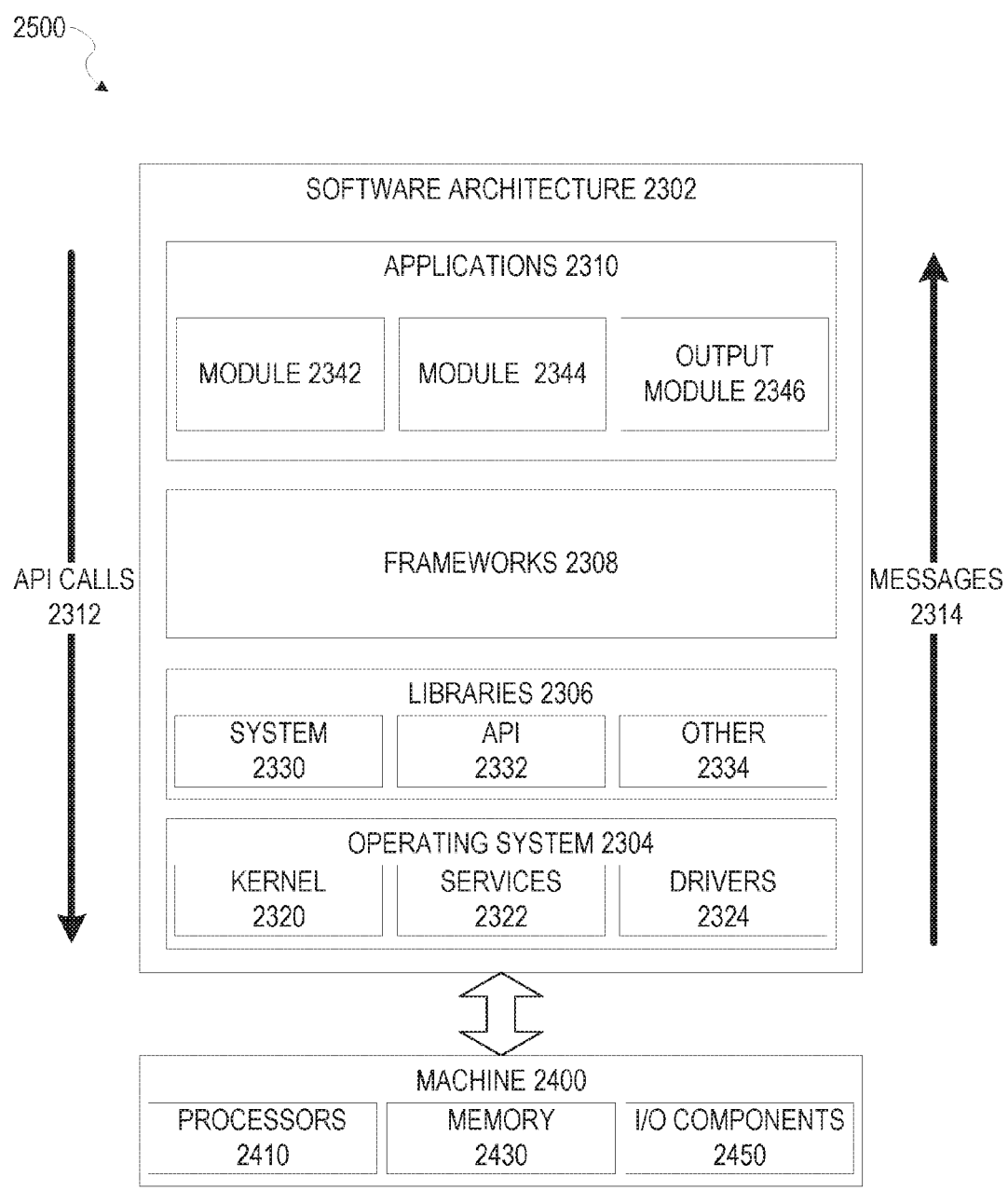
FIG. 25 is a block diagram illustrating an example of a software architecture for suggesting a response to an incoming message at a networked device according to some example embodiments.

FIG. 25 is a block diagram 2500 illustrating an example of a software architecture 2302 to implement any of the methods described herein.

FIG. 25 is merely a non-limiting example of a software architecture 2302, and it will be appreciated that many other architectures can be implemented to facilitate the functionality described herein. In various embodiments, the software architecture 2302 is implemented by hardware such as machine 2400 of FIG. 25 that includes processors 2410, memory 2430, and I/O components 2450. In this example, the software architecture 2302 can be conceptualized as a stack of layers where each layer may provide a particular functionality. For example, the software architecture 2302 includes layers such as an operating system 2304, libraries 2306, frameworks 2308, and applications 2310. Operationally, the applications 2310 invoke application programming interface (API) calls 2312 through the software stack and receive messages 2314 in response to the API calls 2312, consistent with some embodiments. In various embodiments, any client device, server computer of a server system, or any other device described herein may operate using elements of software architecture 2302.

In various other embodiments, rather than being implemented as modules of one or more applications 2310, some or all of modules 2342, 2344, and 2346 may be implemented using elements of libraries 2306 or operating system 2304.

In various implementations, the operating system 2304 manages hardware resources and provides common services. The operating system 2304 includes, for example, a kernel 2320, services 2322, and drivers 2324. The kernel 2320 acts as an abstraction layer between the hardware and the other software layers, consistent with some embodiments. For example, the kernel 2320 provides memory management, processor management (e.g., scheduling), component management, networking, and security settings, among other functionality. The services 2322 can provide other common services for the other software layers. The drivers 2324 are responsible for controlling or interfacing with the underlying hardware, according to some embodiments. For instance, the drivers 2324 can include display drivers, signal processing drivers to optimize modeling computation, memory drivers, serial communication drivers (e.g., Universal Serial Bus (USB) drivers), WI-FI® drivers, audio drivers, power management drivers, camera drivers, and so forth.

In some embodiments, the libraries 2306 provide a low-level common infrastructure utilized by the applications 2310. The libraries 2306 can include system libraries 2330 such as libraries that can provide functions such as memory allocation functions, string manipulation functions, mathematic functions, and the like. In addition, the libraries 2306 can include API libraries 2332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., UIWebView and WKWebView to provide web browsing functionality, Safari View Controller, WebView, Chrome Custom Tabs), and the like. The libraries 2306 may also include other libraries 2334.

The software frameworks 2308 provide a high-level common infrastructure that can be utilized by the applications 2310, according to some embodiments. For example, the software frameworks 2308 provide various graphic user interface (GUI) functions, high-level resource management, high-level location services, and so forth. The software frameworks 2308 can provide a broad spectrum of other APIs that can be utilized by the applications 2310, some of which may be specific to a particular operating system 2304 or platform. In various embodiments, the systems, methods, devices, and instructions described herein may use various files, macros, libraries, and other elements described herein.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time. Alternatively, the hardware module incorporates hardware such as image processing hardware and/or audio processing hardware.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS) or as a "platform as a service" (PaaS). For example, at least some of the operations may be performed by a group of computers (as examples of machines 2400 including processors 2410), with these operations being accessible via a network (e.g., the Internet) and via one or more appropriate interfaces (e.g., an application program interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 2400, but deployed across a number of machines 2400. In some example embodiments, the processors 2410 or processor-implemented modules are located in a single geographic location (e.g., within a home environment, an office environment, or a server farm). In other example embodiments, the processors or processor-implemented modules are distributed across a number of geographic locations.

Figure 26:
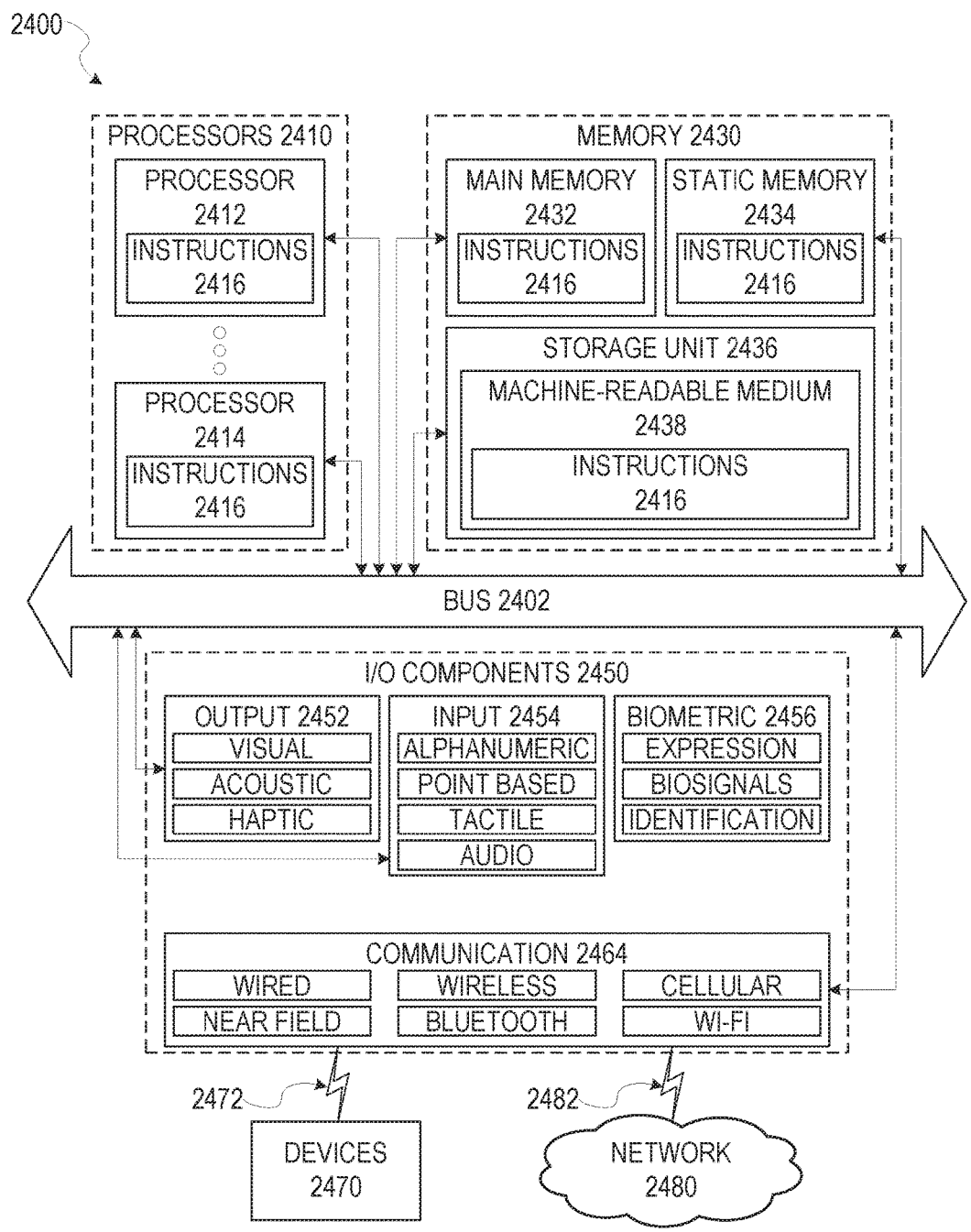
FIG. 26 is a diagrammatic representation of a machine in the form of a computer system within which a set of instructions are executable, causing the machine to suggest a response to an incoming message at a networked device according to some example embodiments.

FIG. 26 is a diagrammatic representation of a machine in the form of a computer system within which a set of instructions are executable, causing the machine to suggest a response to an incoming message at a networked device according to some example embodiments.

FIG. 26 is a diagrammatic representation of a machine 2400 in the form of a computer system within which a set of instructions are executable, causing the machine to suggest a response to an incoming message at a networked device according to some example embodiments discussed herein. FIG. 26 shows components of the machine 2400, which is, according to some embodiments, able to read instructions from a machine-readable medium (e.g., a machine-readable storage medium) and perform any one or more of the methodologies discussed herein. Specifically, FIG. 26 shows a diagrammatic representation of the machine 2400 in the example form of a computer system, within which instructions 2416 (e.g., software, a program, an application, an applet, an app, or other executable code) causing the machine 2400 to perform any one or more of the methodologies discussed herein are executable. In alternative embodiments, the machine 2400 operates as a standalone device or can be coupled (e.g., networked) to other machines. In a networked deployment, the machine 2400 operates in the capacity of a server machine or a client machine in a server-client network environment, or as a peer machine in a peer-to-peer (or distributed) network environment. Examples of the machine 2400 are a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 2416, sequentially or otherwise, that specify actions to be taken by the machine 2400. Further, while only a single machine 2400 is illustrated, the term "machine" also includes a collection of machines 2400 that individually or jointly execute the instructions 2416 to perform any one or more of the methodologies discussed herein.

In various embodiments, the machine 2400 comprises processors 2410, memory 2430, and I/O components 2450, which are configurable to communicate with each other via a bus 2402. In an example embodiment, the processors 2410 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 2412 and a processor 2424 that are able to execute the instructions 2416. In one embodiment the term "processor" includes multi-core processors 2410 that comprise two or more independent processors 2412, 2424 (also referred to as "cores") that are able to execute instructions 2416 contemporaneously. Although FIG. 26 shows multiple processors 2410, in another embodiment the machine 2400 includes a single processor 2412 with a single core, a single processor 2412 with multiple cores (e.g., a multi-core processor 2412), multiple processors 2410 with a single core, multiple processors 2410 with multiples cores, or any combination thereof.

The memory 2430 comprises a main memory 2432, a static memory 2434, and a storage unit 2436 accessible to the processors 2410 via the bus 2402, according to some embodiments. The storage unit 2436 can include a machine-readable medium 2438 on which are stored the instructions 2416 embodying any one or more of the methodologies or functions described herein. The instructions 2416 can also reside, completely or at least partially, within the main memory 2432 such as DRAM or SDRAM or PSDRAM or PSRAM, within the static memory 2434, within at least one of the processors 2410 (e.g., within the processor's cache memory), or any suitable combination thereof, during execution thereof by the machine 2400. Accordingly, in various embodiments, the main memory 2432, the static memory 2434, and the processors 2410 are examples of machine-readable media 2438.

As used herein, the term "memory" refers to a machine-readable medium 2438 able to store data volatilely or non-volatilely and may be taken to include, but not be limited to, random-access memory (RAM), read-only memory (ROM), buffer memory, flash memory, and cache memory. While the machine-readable medium 2438 is shown, in an example embodiment, to be a single medium, the term "machine-readable medium" includes a single medium or multiple media (e.g., a centralized or distributed database, or associated caches and servers) storing the instructions 2416. The term "machine-readable medium" also includes any medium, or combination of multiple media, that is capable of storing instructions (e.g., instructions 2416) for execution by a machine (e.g., machine 2400), such that the instructions 2416, when executed by one or more processors of the machine 2400 (e.g., processors 2410), cause the machine 2400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" includes, but is not limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 2450 include a wide variety of components to receive input, provide output, produce output, transmit information, exchange information, capture measurements, and so on. In general, the I/O components 2450 can include many other components that are not shown in FIG. 15. The I/O components 2450 are grouped according to functionality merely for simplifying the following discussion, and the grouping is in no way limiting. In various example embodiments, the I/O components 2450 include output components 2452 and input components 2454. The output components 2452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Communication is implementable using a wide variety of technologies. The I/O components 2450 may include communication components 2464 operable to couple the machine 2400 to a network 2480 or devices 2470 via a coupling 2482 and a coupling 2472, respectively. For example, the communication components 2464 include a network interface component or another suitable device to interface with the network 2480. In further examples, communication components 2464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2470 may be another machine or any of a wide variety of peripheral devices (e.g., a peripheral device coupled via a Universal Serial Bus (USB)).

Transmission Medium

In various example embodiments, one or more portions of the network 2480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 2480 or a portion of the network 2480 may include a wireless or cellular network, and the coupling 2482 may be a Code Division Multiple Access (CDMA) connection, a Global System for Mobile communications (GSM) connection, or another type of cellular or wireless coupling. In this example, the coupling 2482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, HSDPA (High Speed Downlink Packet Access), HSUPA (High Speed Uplink Packet Access), others defined by various standard-setting organizations, other long range protocols, or other data transfer technology.

Furthermore, the machine-readable medium 2438 is non-transitory (in other words, not having any transitory signals) in that it does not embody a propagating signal. However, labeling the machine-readable medium 2438 "non-transitory" should not be construed to mean that the medium 2438 is incapable of movement; the medium 2438 should be considered as being transportable from one physical location to another. Additionally, since the machine-readable medium 2438 is tangible, the medium 2438 is a machine-readable device.

Figure 27A:
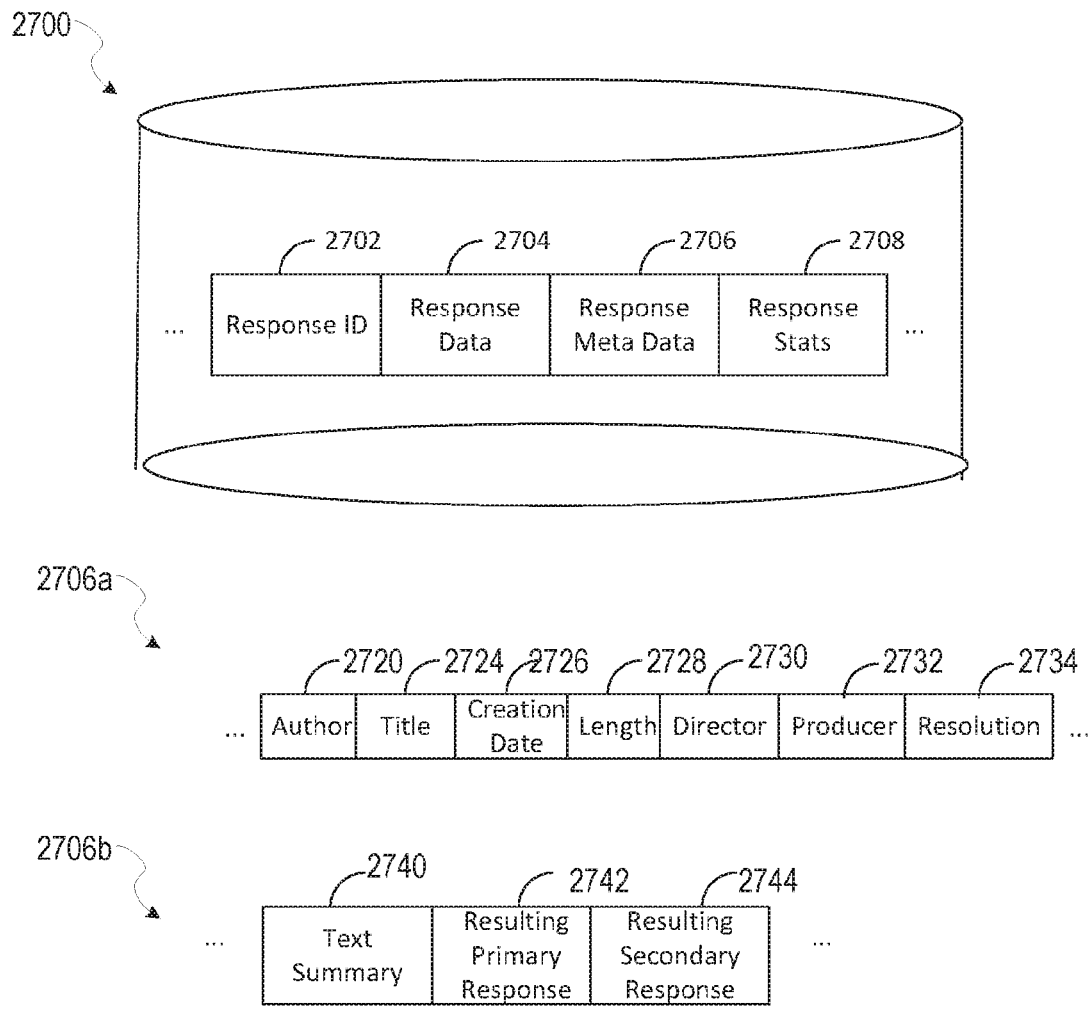
FIGS. 27A-B show exemplary relational databases that may be utilized in some of the disclosed embodiments.
Figure 27B:
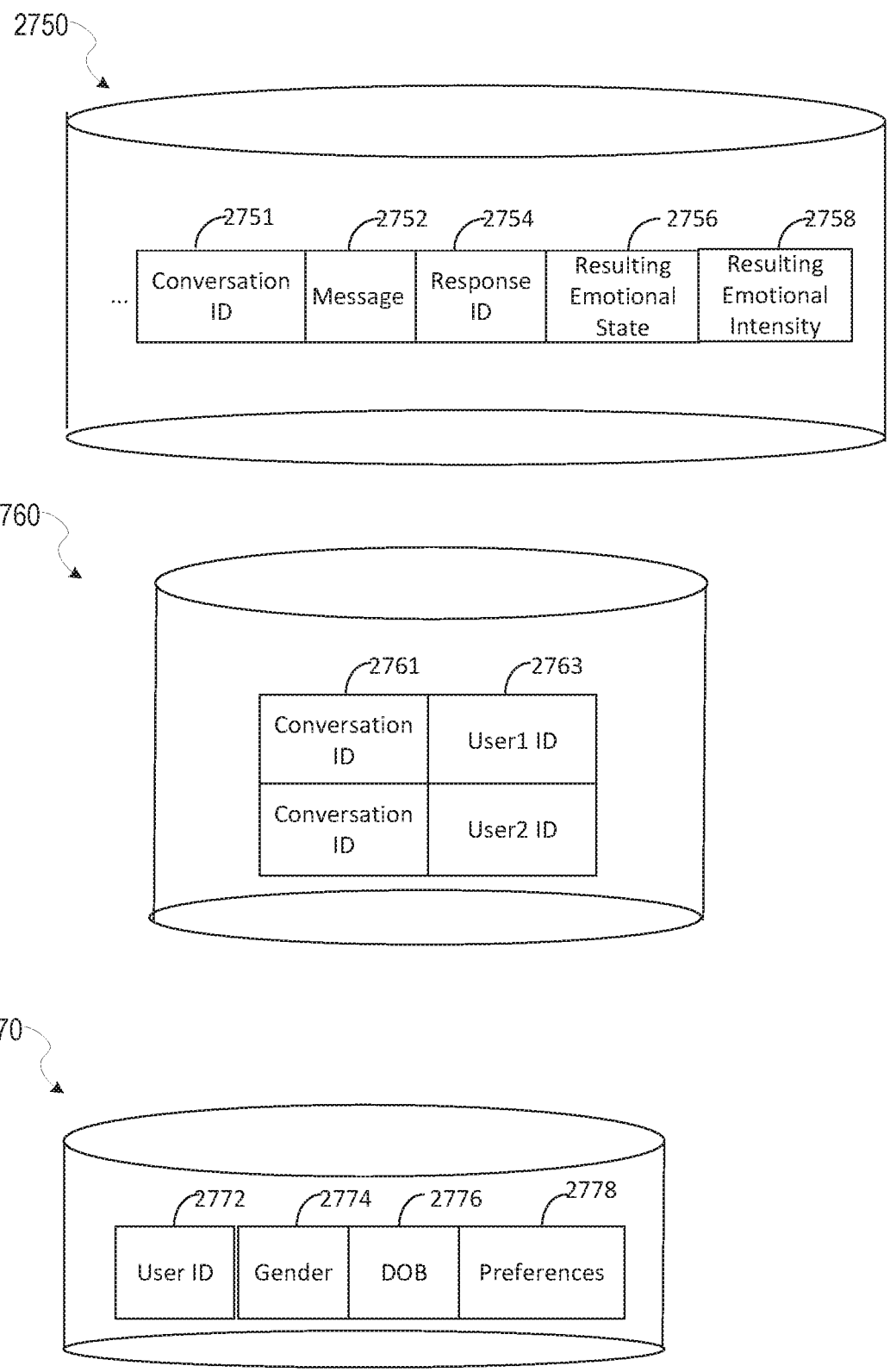
Figure 28A:
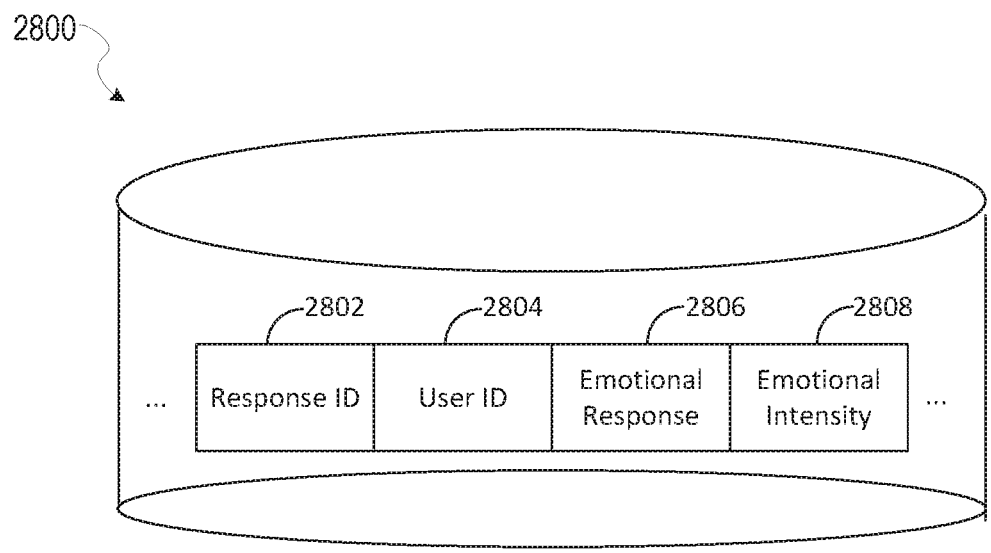
FIG. 28A shows an exemplary emotional response database.
Figure 28B:
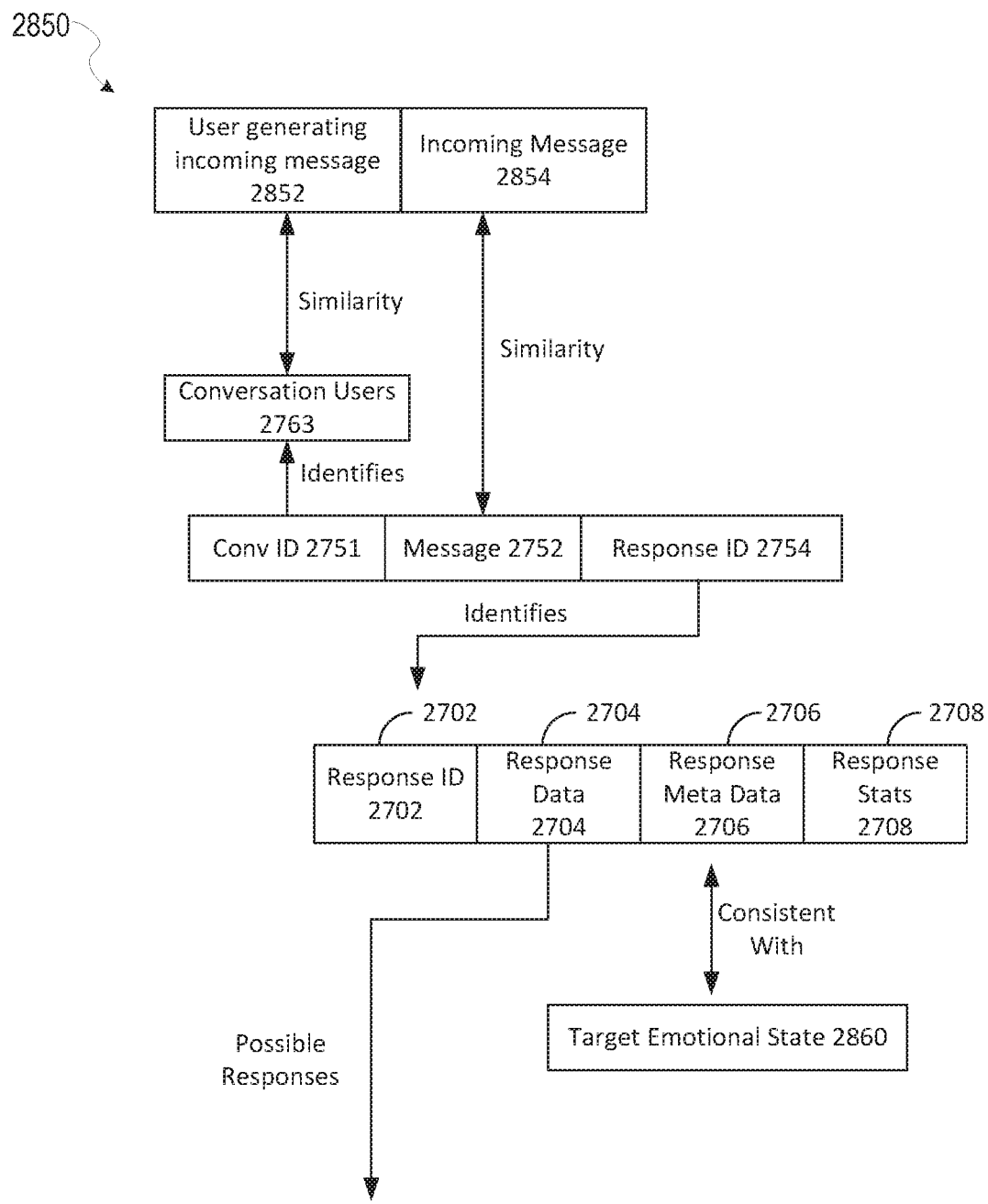
FIG. 28B is a diagram showing relationships between a subset of fields in the databases of FIGS. 27-28A and a user sending an incoming message, and a target emotional state of the user.

FIGS. 28A-B shows exemplary relational databases that may be utilized in some of the disclosed embodiments. In other embodiments, non-relational databases may be utilized. The databases shown in FIGS. 27-28 are merely exemplary and should not be considered to limit the disclosed methods, devices and systems.

FIG. 27A shows an exemplary response database 2700. The database 2700 may be utilized in some of the exemplary embodiments disclosed herein. Each row of the response database 2700 includes a unique response identifier 2702, data defining the response itself 2704, response meta data 2706, and response statistics 2708. The response data 2704 may depend on the type of response. If the response is a text message, response data 2704 may define text. If the response is a vidicon, the response data 2704 may define a video and/or audio to accompany the video. The response meta data 2706 may include both objective metadata 2706*a* and subjective metadata 2706*b*. Objective meta data 2706*a* may vary based on the type of response. If the response is a vidicon, the objective metadata may include at least include data such as an author of the response 2722, title 2724, data/time the response was generated 2726, length of the response 2728, director of the response 2730, producer of the response 2732, and/or resolution of the response 2734. Subjective metadata 2706*b* may also vary based on the type of response. Subjective metadata 2706*b* may include, for example, a text message summarizing a video response 2740. Subjective meta data 2706*b* may also include a primary resulting emotion from the response 2742, and a secondary resulting emotion from the response 2744. The primary and secondary emotional responses 2742 and 2744 may be assigned by an author of the video or an administrator when the vidicon is included in the response database 2700. The primary and secondary emotional responses 2742 and 2744 may be utilized for initial processing of the response. The emotional response information may be tuned by experiential data as the disclosed methods, systems, and devices operate, as described below.

FIG. 27B shows an exemplary relational message database 2750, an exemplary relational conversation database 2760, and an exemplary relational user database 2770. Each of the databases shown in FIG. 27B may be utilized by at least some of the disclosed embodiments.

The exemplary message database 2750 includes records for messages exchanged between two users. The message database 2750 includes a conversation identifier 2751, message 2752, response 2554, a first user id 2756, and a second user id 2758. The conversation identifier 2751 identifies a conversation in which the exchange of message 2752 and response 2754 is a part. The message column 2752 and/or response column 2754 may identify a text message, a vidicon, and/or an emoticon message and/or response. For example, the message column 2752 and/or response column 2754 may include a text string representing a text message/response, a vidicon identifier (such as a response identifier as included in response id column 2702 discussed above) representing a vidicon message/response. The historical message information included in the message database 2750 may be utilized to determine a response to new messages, as discussed further below.

The conversation database 2760 records users that are part of a particular conversation. The conversation identifier 2761 identifies a conversation, and the user id field 2763 identifies one user included in the conversation. Conversations including multiple participants may have multiple rows in the conversation database 2706.

The user database 2770 stores information on users. The user database 2770 includes a user identifier field 2772, gender indication 2774, date of birth indication 2776, and user preferences 2778. The information in the user database may be utilized to determine whether a previous response to a first user is appropriate for a new response to a second user. If the first user and second user have similarities as expressed by their respective characteristics in the user database 2770, the previous response may be appropriate for the second user, under certain conditions.

FIG. 28A shows an exemplary emotional response database 2800. The emotional response database 2800 includes a response identifier 2802, a user identifier 2804, an emotional response 2804, and an emotional intensity 2808.

The emotional response database 2800 may be utilized to store detected emotional responses of users after the users receive a response identified by the response id 2802. The response id 2802 may identify a response via response identifier 2702 of the response database 2700. The accumulated detected emotional responses in the emotional response database 2800 may be utilized to improve characterization of the emotional response provided by particular responses. For example, while the primary emotional response and secondary emotional response stored in the response subjective metadata of metadata 2706 may form an initial starting point for characterization and use of a particular response, this information may be tuned by the recorded emotional responses in the emotional response database 2800, as discussed further below.

FIG. 28B is a diagram showing exemplary relationships between a subset of fields in the databases of FIGS. 27-28A and a user sending an incoming message, and a target emotional state of the user.

FIG. 28B shows that a user 2852 generates an incoming message 2854. The message is received by a device. The receiving device may be the receiving device discussed above with respect to FIG. 4 and/or discussed below with respect to FIGS. 29-31 and/or FIG. 33. A similarity between the incoming message and other messages 2752 may identify associated responses to the messages 2752 in a conversation represented by conversation id 2751. The associated responses may be identified via the response id 2754, which identifies response in the response database 2700 via response id 2702.

The set of responses identified by the similarity with the incoming message may be further qualified based on the response meta data. As discussed above, response meta data may indicate a resulting emotional state when the response was presented. If this resulting emotional state is consistent with a target emotional state 2860 of the user 2852, the response may be more relevant to the incoming message 2854 than other responses with less consistent resulting emotional states.

The set of responses may be further qualified based on similarities between users receiving the responses 2754 and the user 2852. The users receiving the responses are identified via the conversation identifier 2751, via the conversation table 2760 in some aspects.

FIG. 29 is a flowchart of an exemplary method for determining a response to a message. In some aspects, one or more of the functions discussed below with respect to process 2900 may be performed by an electronic hardware processor. For example, instructions stored in an electronic memory may configure one or more electronic hardware processors to perform one or more of the functions discussed below with respect to FIG. 29. In some aspects, one or more of the electronic hardware processors 2410 of FIG. 26 may be configured to perform one or more of the functions discussed below.

In some aspects, process 2900 discussed below may be performed by block 420 of FIG. 4 above.

In block 2905, an incoming message is received by a first user. The incoming message may have been sent by a second user. For example, as discussed above with respect to FIG. 4, a first networked device may receive a message from a second network device. The first user may be utilizing the first networked device to receive the incoming message, while the second user is utilizing the second network device to send the incoming message.

In block 2910, text responses exchanged between the first user and the second user are identified. For example, in some aspects, block 2910 may search the message database 2750 discussed above to identify previous messages transmitted between the first and second users (for example, by matching the first and second users against the user columns 2756 and 2758 of the database 2750. The message column 2752 and/or response id column 2754 may identify text messages exchanged between the two users. The In block 2915, vidicons exchanged between the first and second user are identified. Block 2915 may also search the message database 2750 to identify messages 2752 and/or responses 2702/2704 identified by the response id 2754 that identify a vidicon. In some aspects, the message column 2752 and/or response column 2754 may identify vidicons exchanged between the first and second users, for example, via a response identifier. A response identifier 2702 included in either of the message column 2752 and/or in a response id column 2754 may identify a vidicon in the message database 2700 by identifying a response identifier 2702 that has vidicon data in the corresponding response data field 2704.

In block 2920, subjective metadata for the identifier vidicons is identified. If one of the message column 2752 and/or response column 2754 identifies a vidicon. the identified vidicon may have text data associated with it via the metadata 2706. For example, as discussed above, the vidicon meta data 2706 may include a text summary 2740 of the vidicon.

In some aspects, the subjective metadata identified in block 2920 may include emotional responses and intensities detected when the vidicons were presented. This information may be provided via the emotional response database 2800 discussed above. Population of the emotional response database 2800 is discussed in more detail with respect to FIG. 32 below.

In some aspects of block 2920, the emotional responses and/or intensities stored in the database 2800 may be included in the subjective metadata based on a configuration parameter, such as an "emocapture" parameter. If "emocapture" is enabled, metadata for a vidicon relating to an emotional response caused by the vidicon may be more heavily weighted in the search of block 2925 discussed below than if the "emocapture" feature is disabled.

In block 2925, the message database 2750 is searched for similar responses based on the identified text messages and text based subjective metadata (identified in block 2920) exchanged between the first and second user and the incoming message. In some aspects, resulting emotional state information, such as that provided by subjective response metadata 2742 and/or 2744, may be compared to a target emotional state as part of the search. This information may generate a similarity score between the identified text messages and the incoming message. Block 2925 may utilize a multivariate search in some aspects. The identified text messages and vidicons may be input parameters for the search in some aspects. The target emotional state and resulting emotional states of the identified text messages and vidocons may also be input parameters for the search in some aspects. In some aspects, block 2920 may utilize elastic search, a search engine based on Lucene to provide the search capability. In some aspects, the text messages exchanged and vidicon text based metadata identified above, and used as parameters in the search may be assigned different weights when performing the elastic search.

In block 2930, responses identified by the search are added to a suggested response list. In some aspects, block 2930 includes presenting the identified responses on an electronic display to a user. Block 2930 may also include receiving input selecting one of the responses, and transmitting the selected response to the second user in response to the selection. Alternatively, the responses identified in block 2930 may form only a portion of a complete suggested response list, as discussed below.

FIG. 30 is an exemplary method for identifying possible responses to an incoming message. In some aspects, process 3000 discussed below with respect to FIG. 30 may be utilized in conjunction with process 2900 discussed above. For example, process 2900 may identify a first set of responses and process 3000 may identify a second set of responses. The first and second responses may be integrated in a number of ways to produce a single set of responses. For example, the first and second responses may be ranked and sorted by their ranks. Ranks may be assigned at least in part, by a relevance score returned by the elastic search utilized to identify the responses, for example, as discussed above with respect to block 2925 and block 3010 below.

In some aspects, one or more of the functions discussed below with respect to process 3000 may be performed by an electronic hardware processor. For example, instructions stored in an electronic memory may configure one or more electronic hardware processors to perform one or more of the functions discussed below with respect to FIG. 30. In some aspects, one or more of the electronic hardware processors 2410 of FIG. 26 may be configured to perform one or more of the functions discussed below. In some aspects, process 3000 discussed below may be performed by block 420 of FIG. 4 above.

In block 3005, objective metadata for responses is identified. The responses referenced in block 3005 may include the responses identified as part of block 2915, discussed above with respect to FIG. 29.

In block 3010, a search for responses having similar objective metadata is performed. In some aspects, the search may also seek to identify responses having a resulting emotional state similar to a target emotional state, as discussed above with respect to FIG. 4 for example. In some aspects the message database 2750 may be searched to identify messages 2752 and/or responses 2754 having similar objective metadata to that identified in block 3005. In some aspects, portions of the objective metadata (e.g. 2706*a*) may be utilized as input parameters for the search. In some aspects, different fields (e.g., author 2730, title 2724, creation date 2726, length 2728, director 2730, producer 2732, resolution 2734) of the objective metadata 2706*a* may be assigned different weights. The different weights may also be input parameters for the search. In some aspects, the search may be a multivariate search. In some aspects, elastic search by Lucerne may be utilized as a search engine for block 3010. In some aspects, responses identified in block 3010 may be added to the responses of block 2925. The two sets of responses may be integrated, in some aspects, as described above.

In block 3015, the identified second response may be include on a suggested response list. In some aspects, the suggested response list referenced in block 3015 may be the same suggested response list as referenced in block 2930. In some aspects, the second responses may be presented on an electronic display. In some aspects, as discussed above, the responses identified in block 3010 may be integrated with the responses identified in block 2925, and the integrated responses may be presented. In some aspects, input may then be received selecting a particular response, and the response may be transmitted to the second user (of block 2905.

FIG. 31 is a flowchart of an exemplary method of identifying responses to an incoming message. In some aspects, process 3100 discussed below with respect to FIG. 31 may be utilized in conjunction with process 2900 and/or process 3000 discussed above. For example, process 2900 and/or process 3000 may identify a first set of responses and process 3000 may identify a second set of responses. Process 3100 may identify a third set of responses. The first, second, and third responses may be integrated in a number of ways to produce a single set of responses. For example, the first, second, and/or third sets of responses may be ranked and sorted by their ranks. Ranks may be assigned at least in part, by a relevance score returned by the elastic search utilized to identify the responses, for example, as discussed above with respect to blocks 2925, and 3010, and block 3125 discussed below.

In some aspects, one or more of the functions discussed below with respect to process 3100 may be performed by an electronic hardware processor. For example, instructions stored in an electronic memory may configure one or more electronic hardware processors to perform one or more of the functions discussed below with respect to FIG. 31. In some aspects, one or more of the electronic hardware processors 2410 of FIG. 26 may be configured to perform one or more of the functions of process 3100 discussed below. In some aspects, process 3100 discussed below may be performed by block 420 of FIG. 4 above.

For completeness, process 3100 is shown to include block 2905 of process 2900. In block 3110, text responses exchanged between any users are identified. For example, in some aspects, block 2910 may search the message database 2750 discussed above to identify previous messages and responses as recorded in columns 2752 and/or 2754. The message column 2752 and/or response column 2754 may identify text messages exchanged between the two users in some aspects.

In block 3115, vidicons exchanged between any users are identified. Block 2915 may also search the message database 2750 to identify messages 2752 and/or responses 2754 that identify a vidicon. In some aspects, the message column 2752 and/or response column 2754 may identify vidicons exchanged in a conversation between users, for example, via a response identifier 2702. A response identifier 2702 included in either of the message column 2752 and/or response id column 2754 may identify a vidicon in the response database 2700 by identifying a response identifier 2702 that holds data defining a vidicon in the corresponding response data field 2704.

In block 3120, subjective metadata for the identifier vidicons is identified. If one of the message column 2752 and/or response column 2754 identifies a vidicon. the identified vidicon may have text data associated with it via the metadata 2706. For example, as discussed above, the vidicon meta data 2706 may include a text summary 2740 of the vidicon. In some aspects, the subjective metadata identified in block 3120 may include emotional responses detected from users when the vidicons were presented to users. This information may be provided via the emotional response database 2800 discussed above. How the emotional response database 2800 is populated is discussed in more detail with respect to FIG. 32 below.

In some aspects of block 3120, the emotional responses 2806 and/or emotional intensities 2808 stored in the database 2800 may be included in the subjective metadata based on a configuration parameter, such as an "emocapture" parameter. If an "emocapture" is enabled, metadata for a vidicon relating to an emotional response caused by the vidicon may be more heavily weighted in the search of block 3125 discussed below than if the "emocapture" feature is disabled.

In block 3125, the message database 2750 is searched for similar responses based on the identified text messages and text based subjective metadata (identified in block 3120) exchanged between any users. Block 3125 may utilize a multivariate search in some aspects. The identified text messages and vidicons may be input parameters for the search in some aspects. In some aspects, block 3120 may utilize elasticsearch, a search engine based on Lucene to provide the search capability. In some aspects, the text messages exchanged and vidicons exchanged, and used as parameters in the search may be assigned different weights when performing the elastic search.

In block 3130, responses identified by the search are added to a suggested response list. In some aspects, the suggested response list of block 3130 may be the same list as the suggested response list of block 2930, discussed above with respect to FIG. 29. In some aspects, block 3130 includes presenting the identified responses on an electronic display to a user. Block 3130 may also include receiving input selecting one of the responses, and transmitting the selected response to the second user in response to the selection. Alternatively, the responses identified in block 31130 may form only a portion of a complete suggested response list, for example, in combination with responses identified in one or more of processes 2900 and 3000, discussed above.

Figure 32:
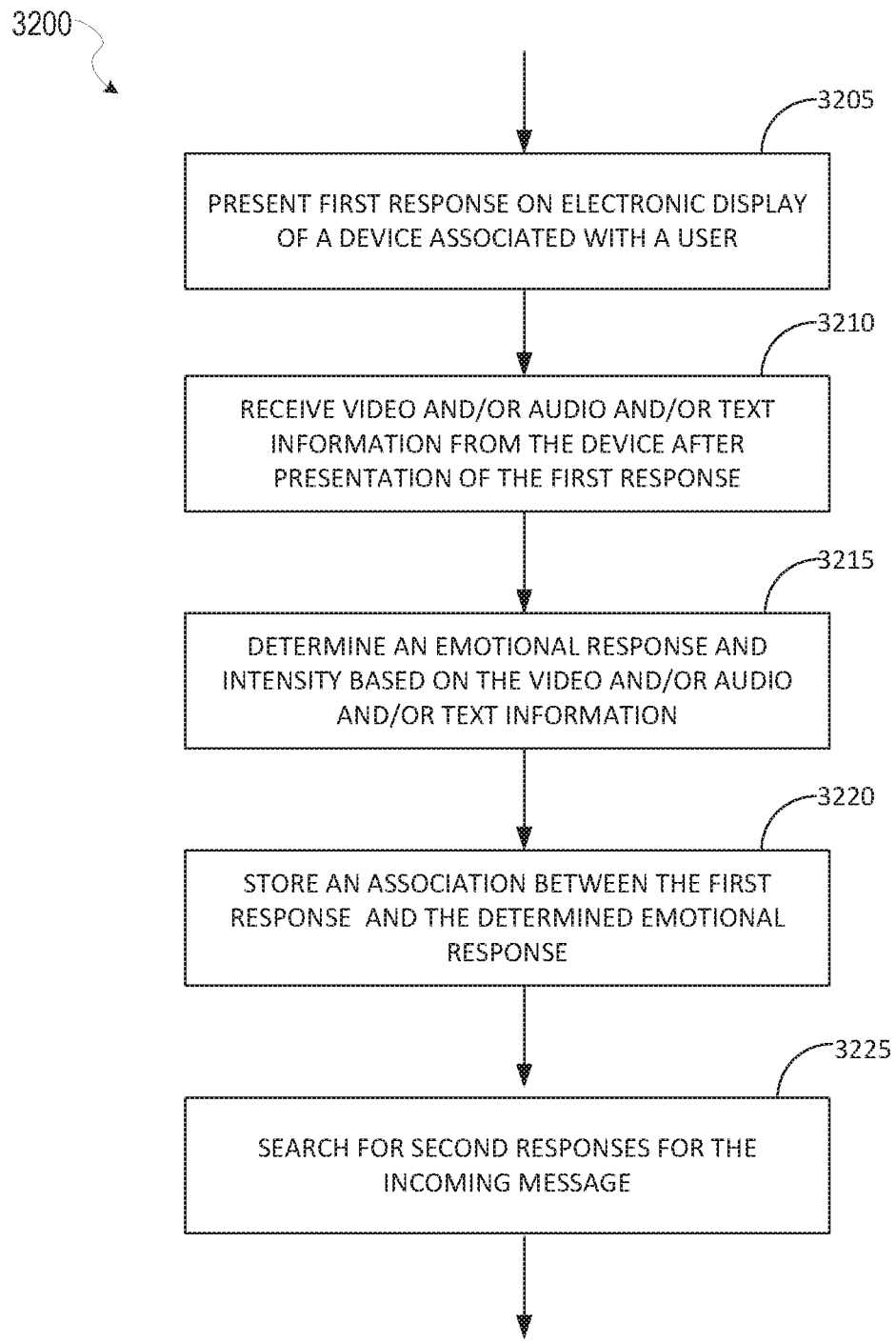
FIG. 32 is a flowchart of an exemplary method of determining an emotional response to a message presented to a user.

FIG. 32 is a flowchart of an exemplary method of determining an emotional response to a message presented to a user. In some aspects, the message is a vidicon, but may be a text message or emoji, or other type of message in various aspects.

In some aspects, one or more of the functions discussed below with respect to process 3200 may be performed by an electronic hardware processor. For example, instructions stored in an electronic memory may configure one or more electronic hardware processors to perform one or more of the functions discussed below with respect to FIG. 32. In some aspects, one or more of the electronic hardware processors 2410 of FIG. 26 may be configured to perform one or more of the functions of process 3200 discussed below.

In block 3205, a message is presented on an electronic display of a device associated with the user. For example, in some aspects, the message may be a text message, a vidicon, or a emoji. In other aspects, any other type of message may be presented.

In block 3210, image/video and/or audio and/or text information is received from the device. In some aspects, the image/video information may be captured by an imaging sensor integrated with the device. In some aspects, the audio data may be captured by a microphone integrated into the device. In some aspects, the text information may be in the form of a text based response typed by the user into a keyboard or touch screen interface of the device.

In block 3215, an emotional response and an intensity of the response are determined based on the video and or audio and/or text information. In some aspects for example, a smile detected based on the video information may indicate a happy emotional response, while a frown may indicate an unhappy emotional response. In some aspects, a large smile may indicate a first intensity while a smaller smile may indicate a second intensity lower than the first intensity.

In block 3220, an association between the first response and the determined emotional response and intensity is stored. In some aspects, this association is stored in the emotional response database 2800 discussed above with respect to FIG. 28A. For example, the response and intensity may be stored to the emotional response and emotion intensity columns 2806 and 2808 respectively.

In block 3225, a search for second responses for an incoming message is performed. In some aspects, the incoming message may be the same incoming message as referenced in any of FIGS. 29-31. In some aspects, block 3225 may include one or more of the functions discussed above with respect to blocks 2925, 3010, and/or 3125. In some aspects, the search of block 3225 may be based at least in part, on the association between the first response and the determined emotional response stored in block 3220. For example, in some aspects the search may receive as input a target emotional state. Target emotional states are discussed in detail above. The stored association of block 3230 provides a resulting emotional state when the first response is presented, as described above. Thus, the search may be able to determine a relevance or similarity between the resulting emotional state from presentation of the first response, and the target emotional state. If a similarity between the target emotional state and the resulting emotional state is above a threshold, the first response may be suggested as a response to the incoming message. Thus, the first response may be include in the second responses of block 3225. In some aspects, the second responses of block 3225 may be integrated with response identified in one or more of blocks 2930, 3015, and 3130.

Figure 33:
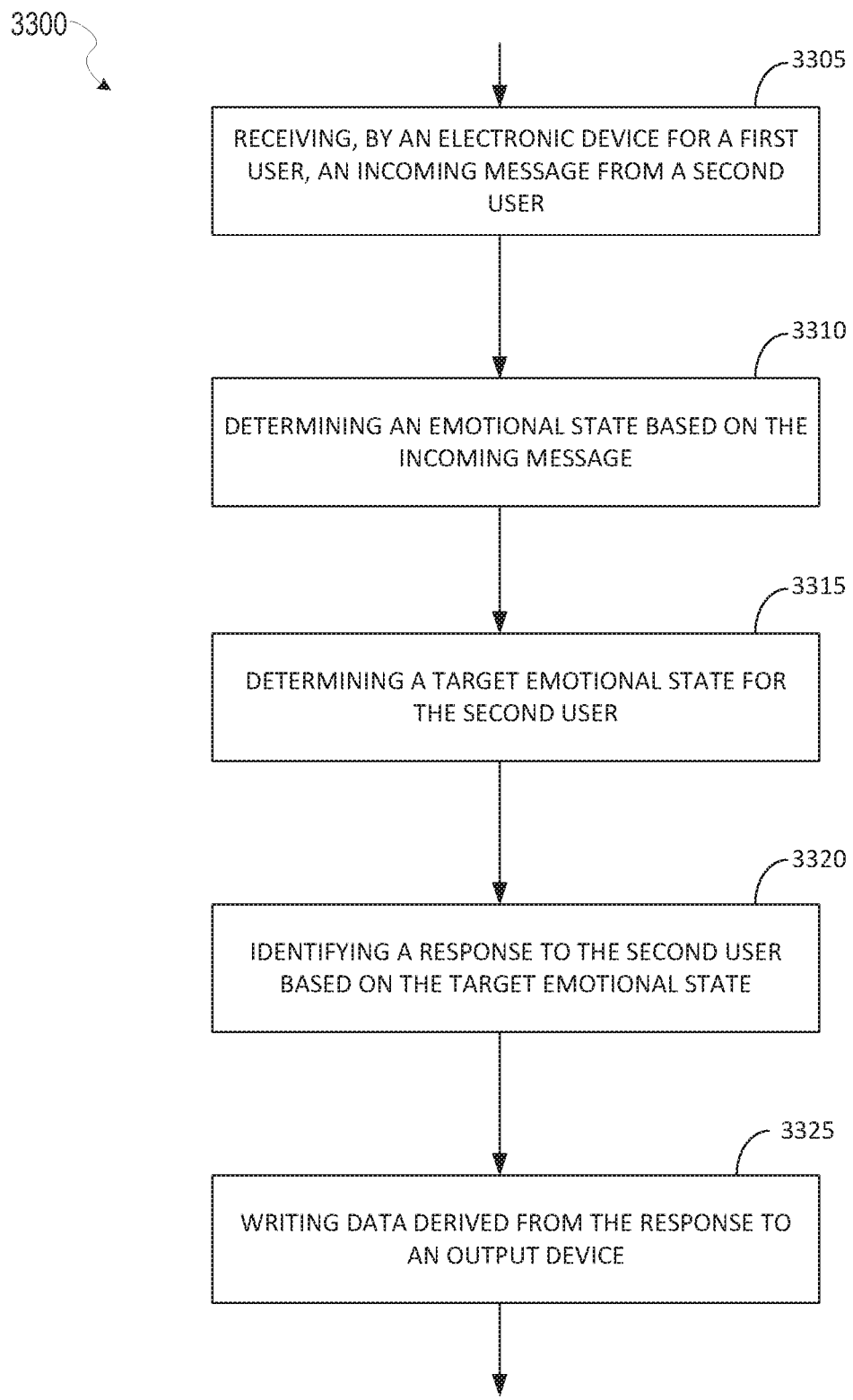
FIG. 33 is a flowchart of an exemplary method of determining an emotional response to a message presented to a user.

FIG. 33 is a flowchart of an exemplary method for identifying a response to an incoming message. In some aspects, one or more of the functions discussed below with respect to process 3300 may be performed by an electronic hardware processor. For example, instructions stored in an electronic memory may configure one or more electronic hardware processors to perform one or more of the functions discussed below with respect to FIG. 33. In some aspects, one or more of the electronic hardware processors 2410 of FIG. 26 may be configured to perform one or more of the functions of process 3300 discussed below. In some aspects, process 3300 may include any of the functions discussed throughout this application above. For example, any of the functions discussed with respect to FIG. 4 and/or FIG. 29-32 may be included in process 3300.

In block 3305, an incoming message is received by a first user. The first user may be associated with a first device. For example, the first user may receive the incoming message via the first device. The incoming message is sent from a second user to the first user. In some aspects, the second user may utilize a second device to transmit the incoming message to the first user. In other aspects, the second user may speak or type input that is received directly by the first device, for example, via a microphone and/or touchscreen/keyboard. In some aspects, the incoming message may be part of a conversation between the first and second user. For example, in some aspects, a conversation identifier may be recorded in the conversation database 2760, with multiple rows in the conversation database 2760 indicating a set of users participating in the conversation. Multiple messages and responses occurring in the conversation may be stored in the message database and tied together via the conversation id field 2751, In block 3310, an emotional state of the second user is determined based on the incoming message. For example, FIGS. 5-11 above describe various embodiments of determining an emotional state of the second user (i.e. present state at networked device in FIG. 5 for example).

In block 3315, a target emotional state is determined for the second user. In some aspects, FIGS. 12-15 describe methods of determining a target emotional state. In some aspects, the target emotional state is based on the current emotion state determined in block 3310. The incoming message may also effect the target emotional state, as discussed above.

In block 3320, a response to the second user is identified based on the target emotional state. In some aspects, the response is identified by performing a multivariant search on a set of historical responses resulting in the target emotional state. The multivariant search may determine relevance scores for each of the set of historical responses based on input parameters provided to the search. The historical responses may be stored, for example, in a database such as the response database 2700 in some aspects. In some aspects, the multivariant search may be performed on the message database 2750, which references, in some aspects, the response database 2700 via the response identifier field 2752. In some aspects, the multivariant search utilizes Lucerne elastic search. Inputs to the multivariant search may include the target emotional state and one or more characteristics of the second user, such as the second user's age, gender, or other characteristics or preferences. Inputs may also include the incoming message, the present emotional state of the second user (as determined in block 3310 for example).

In some aspects, responses may be identified from historical or previous conversations having similar characteristics as the conversation between the first and second users. For example, in some aspects, set of words present in the previous conversations may be compared to sets of words in the conversation between the first and second users. The sets of words may be obtained in some aspects by aggregating words included in the message 2752 or response identified by the response id 2754 for a particular conversation id 2751. If any particular previous conversation has, when compared to the conversation between the first and second users, a number of overlapping words that is above a threshold or a threshold percent, then responses may be identified from the particular conversation. The rationale supporting this approach is that a response resulting in a particular emotional state is more likely to result in a similar emotional state if the conversation in which the response took place has a similar context as the present conversation between the first and second users. Overlap in words used in the conversation is one heuristic for context in some aspects. Other embodiments may approximate the similarities of context between two conversations using other heuristics.

In some aspects, block 3320 includes identifying previous responses and resulting emotional states associated with those previous responses, and identifying the response from the previous responses having resulting emotional states consistent with the target emotional state. Consistent emotional states are those emotional states that move the present emotion state of the second user at least towards the target emotional state. For example, emotional states that move the emotional state of the second user to a higher state on state scale 1200 are consistent with the target emotional state, as explained above with respect to FIG. 12. Emotional states that move the emotional state of the second user to a lower state are consistent with the target state when the target state is lower on the state scale 1300, as explained above with respect to FIG. 13.

As discussed above with respect to message database 2750 and response database 2700, previous responses may have associated resulting emotional states. Some aspects of block 3320 may search one or more of these databases to identify previous responses that could be provided to the second user and move the second user toward the target emotional state. In some aspects, the identified responses may be further narrowed down or limited to be those responses provided to users with characteristics similar to the second user. The similarity of characteristics between two users may result in different relevance scores in a multivariant search described above. Responses provided to users with equivalent genders, ages, or other characteristics may be preferred over responses to users having different characteristics. To illustrate a response provided to a man resulting in a happy state may not result in the same emotional state when provided to a woman. Thus, the better the match between characteristics of the second user and characteristics of users to which the historical or previous responses were provided, the better.

In some aspects, portions of the historical database of responses and resulting emotional states, upon which process 3300 may operate, may be generated by process 3200, which detects an emotional state resulting from presentation of a particular response. Process 3200 may populate or at least influence the emotional response fields 2742, 2744, 2756, 2758, 2806, and/or 2808 in some aspects. The identification of the response to the second user may be based at least in part, on these emotional response fields, which may be influenced by process 3200 in some aspects. In other aspects these response fields, or at least some of these response fields, may be preconfigured by an administrator based on a library of known emotional responses to a set of predetermined responses.

In some aspects, block 3320 may include one or more of the functions discussed above with respect to processes 2900, 3000, and/or 3100. For example, block 3320 may include identifying previous text responses sent by the first user to the second user, identifying previous video based responses sent by the first user to the second user, identifying text descriptions for the previous video based responses, identifying a subset of the previous text and video based responses having resulting emotional states consistent with the target emotional state, wherein the identified response is based on the subset. Identification of the subset may also be based on a similarity between the incoming message and messages preceding the responses include in the subset. For example, the multivariant search may compare message fields 2752 in the message database with the incoming message when determining which responses 2754 may be provided to the second user. The multivariant search may also compare the target emotional state with emotional states resulting from the subject responses.

Some aspects of block 3320 also include identifying objective metadata for the previous messages, identifying second responses provided to other users, identify second objective metadata for the second responses, identifying a second subset of one or more additional responses to the incoming message from the second responses with resulting emotional states consistent with the target emotional state, wherein the identified response is derived from a combination of the first and second subset. In some aspects, the objective metadata includes first metadata and second metadata. Process 3300 may assign different weights to the first metadata and the second metadata. The identification of the second subset is based on the different weights. As one example, a multi-variant search of the response database 2700 may weight matches of director field 2730 more highly than matches of the producer field 2732.

Some aspects of block 3320 include identifying second previous text messages exchanged between third and fourth users, identifying second previous video based messages exchanged between the third and fourth users, identifying second text descriptions for the second previous video based messages, identifying one or more second responses to the incoming message based on similarities between the text messages and text descriptions and the incoming message, and further based on a consistency between the target emotional state of the second user and resulting emotional states associated with the second text messages and text descriptions. In some aspects, different weights are assigned to the text messages and the text descriptions when performing a multivariant search of the response database to identify the second responses, with the multivariant search based on the weights.

In some aspects of process 3300, a plurality of responses to the second user may be identified based on the target emotional state. The plurality of responses may be presented on an electronic display. Input may be received from the first user selecting one of the presented responses. The selected response may then be provided to the second user. For example, writing of the response to the output device might include writing audio data derived from the selected response to a speaker. Alternatively, or additionally, writing of the response to the output device could include presenting the selected response on an electronic display associated with the second user. For example, the second user may be utilizing a second device to communicate with the first user. This second device may have an electronic display upon which the selected response is presented.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method of determining a response to an incoming message, comprising:
receiving, by a first electronic device for a first user, the incoming message from a second user;

determining an emotional state associated with the incoming message;
determining a target emotional state for the second user;
identifying the response to the second user based on the target emotional state, wherein identifying the response to the second user based on the target emotional state comprises:
 identifying previous text responses sent by the first user to the second user,
 identifying previous video based responses sent by the first user to the second user,
 identifying text descriptions for the previous video based responses,
 identifying a first subset of the previous text and video based responses having resulting emotional states consistent with the target emotional state,
 identifying objective metadata for the previous responses,
 identify second responses provided to other users,
 identify second objective metadata for the second responses,
 identifying a second subset of one or more additional responses to the incoming message from the second responses with second objective metadata indicating resulting emotional states consistent with the target emotional state, wherein the identified response is derived from a combination of the first and second subset; and
writing data derived from the response to an output device.

2. The method of claim 1, further comprising:
identifying a set of users having characteristics similar to the second user;
identifying second responses to users in the set of users; and
identifying a subset of the second responses with resulting emotional states consistent with the target emotional state, wherein the identifying of the previous responses identifies the subset.

3. The method of claim 2, further comprising identifying the set of users based on one or more of each user's age, gender, or preferences.

4. The method of claim 1, further comprising:
presenting a response to a third user;
receiving one or more of image, video, audio, or text data from the third user;
generating one or more of an emotional response indication and an emotional intensity indication based on the received one or more image, video, audio, or text data;
storing an association between the presented response and the one or more of the generated emotional response indication and emotional intensity indication, wherein the identification of the response to the second user based on the target emotional state is based on the stored association.

5. The method of claim 4, further comprising receiving the one or more of image, video, audio, or text data in a network message from a device associated with the third user.

6. The method of claim 1, further comprising:
identifying a first conversation including the incoming message, the first conversation including a first context;
identifying historical conversations having historical contexts similar to the first context; and
limiting identification of the response to responses included in the identified historical conversations.

7. The method of claim 1, further comprising:
identifying a plurality of responses to the second user based on the target emotional state;
presenting the plurality of responses on an electronic display;
receiving input selecting one of the plurality of responses; and
identifying the selected response as the response to the second user.

8. The method of claim 1, further comprising identifying the response to the second user by performing a multivariant search on a set of historical responses resulting in the target emotional state.

9. The method of claim 8, wherein the multivariant search utilizes Lucerne elastic search.

10. The method of claim 8, further comprising passing characteristics of the second user and the target emotional state as inputs to the multivariant search.

11. The method of claim 1, wherein the objective metadata includes first metadata and second metadata, and the method further comprises assigning different weights to the first metadata and the second metadata, wherein the identification of the second subset is based on the different weights.

12. An apparatus for determining a response to an incoming message, comprising:
one or more hardware processors, the hardware processors configured to:
 receive, for a first user, the incoming message from a second user,
 determine an emotional state associated with the incoming message,
 determine a target emotional state for the second user,
 identify the response to the second user based on the target emotional state by:
  searching a message database using an elastic search to determine relevance scores for a plurality of responses based on meta data associated with the responses, the meta data including indications of resulting emotional states of the responses, characteristics of users provided with the responses, messages preceding the responses, and the incoming message,
  identifying previous responses and resulting emotional states associated with those previous responses,
  identifying the response from the previous responses having resulting emotional states consistent with the target emotional state by identifying responses that resulted in an emotional state closer to the target emotional state than the emotional state associated with the incoming message is to the target emotional state and based on the relevance scores; and
 write data derived from the response to an output device.

13. A non-transitory computer readable medium comprising instructions that when executed, cause an electronic hardware processor to perform a method of determining a response to an incoming message, the method comprising:
receiving, by a first electronic device for a first user, the incoming message from a second user;
determining an emotional state associated with the incoming message;
determining a target emotional state for the second user;
identifying the response to the second user based on the target emotional state by:

searching a message database using an elastic search to determine relevance scores for a plurality of responses based on meta data associated with the responses, the meta data including indications of resulting emotional states of the responses, characteristics of users provided with the responses, messages preceding the responses, and the incoming message, identifying previous responses and resulting emotional states associated with those previous responses, identifying the response from the previous responses having resulting emotional states consistent with the target emotional state by identifying responses that resulted in an emotional state closer to the target emotional state than the emotional state associated with the incoming message is to the target emotional state and based on the relevance scores; and writing data derived from the response to an output device.

* * * * *